US012597385B2

(12) United States Patent
Kim et al.

(10) Patent No.: US 12,597,385 B2
(45) Date of Patent: Apr. 7, 2026

(54) ELECTRONIC DEVICE AND METHOD FOR DISPLAYING SCREEN INCLUDING VISUAL OBJECT

(71) Applicant: Samsung Electronics Co., Ltd., Suwon-si (KR)

(72) Inventors: Sejong Kim, Suwon-si (KR); Changrae Lee, Suwon-si (KR); Sangheon Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/443,891

(22) Filed: Feb. 16, 2024

(65) Prior Publication Data

US 2024/0282252 A1 Aug. 22, 2024

Related U.S. Application Data

(63) Continuation of application No. PCT/KR2024/000665, filed on Jan. 12, 2024.

(30) Foreign Application Priority Data

Feb. 22, 2023 (KR) ........................ 10-2023-0023962
Mar. 17, 2023 (KR) ........................ 10-2023-0034991

(51) Int. Cl.
*G09G 3/20* (2006.01)
*G09G 3/3208* (2016.01)

(52) U.S. Cl.
CPC ..... *G09G 3/3208* (2013.01); *G09G 2330/021* (2013.01); *G09G 2340/04* (2013.01)

(58) Field of Classification Search
CPC ........... G09G 3/3208; G09G 2330/021; G09G 2340/04
See application file for complete search history.

(56) References Cited

U.S. PATENT DOCUMENTS 7,447,351 B2 * 11/2008 Ubillos .................. H04N 1/622 345/589
9,330,591 B2 * 5/2016 Jeong ................... G09G 3/2007
(Continued)

FOREIGN PATENT DOCUMENTS

KR 20030075189 A 9/2003
KR 10-2011-0072000 6/2011
(Continued)

OTHER PUBLICATIONS

Search Report and Written Opinion dated Apr. 18, 2024 issued in International Patent Application No. PCT/KR2024/000665.
(Continued)

*Primary Examiner* — Jose R Soto Lopez
(74) *Attorney, Agent, or Firm* — Nixon & Vanderhye P.C.

(57) ABSTRACT

An electronic device includes memory storing instructions. The electronic device includes at least one processor comprising processing circuitry. The electronic device includes a display panel including a plurality of pixels. The instructions, when executed by the at least one processor individually and/or collectively, cause the electronic device to: display, through the display panel, a screen for a low-power state including at least one visual object; identify an event for displaying a visual object in the screen while displaying the screen; identify an on-pixel ratio (OPR) of the visual object in response to the event; and based on changing a first value representing an attribute of the visual object to a second value lower than the first value in response to the OPR being higher than a reference OPR, display, through the display panel, the screen including the visual object.

20 Claims, 24 Drawing Sheets

(56) References Cited

U.S. PATENT DOCUMENTS

| | | | | |
|---|---|---|---|---|
| 10,157,568 | B2 | 12/2018 | Bang | |
| 10,304,409 | B2 | 5/2019 | You | |
| 10,852,905 | B1 * | 12/2020 | Guzman | G06F 8/38 |
| 10,902,772 | B2 | 1/2021 | Kim et al. | |
| 11,106,307 | B2 | 8/2021 | Bae et al. | |
| 11,294,554 | B2 | 4/2022 | Kim | |
| 11,545,061 | B2 | 1/2023 | Kim et al. | |
| 2004/0075045 | A1 | 4/2004 | Hermsen | |
| 2008/0295028 | A1 * | 11/2008 | Nagasaka | G06F 3/04817 715/810 |
| 2011/0050602 | A1 * | 3/2011 | Jeong | H04M 1/67 345/173 |
| 2011/0063325 | A1 * | 3/2011 | Saunders | H04N 23/64 345/639 |
| 2011/0199315 | A1 * | 8/2011 | Kent | G06F 3/043 345/173 |
| 2012/0297215 | A1 * | 11/2012 | Saba | G06F 1/3203 713/320 |
| 2014/0092140 | A1 * | 4/2014 | Wadhwa | G09G 3/20 345/660 |
| 2014/0292820 | A1 * | 10/2014 | Park | G06T 11/001 345/83 |
| 2014/0306980 | A1 * | 10/2014 | Won | H04M 1/72427 345/589 |
| 2014/0333602 | A1 * | 11/2014 | Yang | G06F 1/3265 345/212 |
| 2015/0130867 | A1 * | 5/2015 | Park | G09G 3/3208 345/694 |
| 2015/0255016 | A1 * | 9/2015 | An | G09G 3/3233 345/211 |
| 2015/0364076 | A1 * | 12/2015 | Park | G09G 3/3233 345/77 |
| 2016/0012622 | A1 * | 1/2016 | Lee | G06F 3/14 345/629 |
| 2016/0118022 | A1 * | 4/2016 | Chun | G09G 3/2007 345/690 |
| 2016/0133223 | A1 * | 5/2016 | Kim | G09G 3/3225 345/211 |
| 2016/0147284 | A1 * | 5/2016 | Kim | G06F 9/44 713/320 |
| 2016/0158599 | A1 * | 6/2016 | Roslyakov | A63B 71/06 700/92 |
| 2016/0188023 | A1 * | 6/2016 | Chang | G06V 40/13 345/173 |
| 2016/0189619 | A1 * | 6/2016 | Park | G09G 3/3233 345/77 |
| 2016/0247437 | A1 * | 8/2016 | Choi | G09G 3/2003 |
| 2017/0003714 | A1 * | 1/2017 | Kwon | G06F 3/147 |
| 2017/0003756 | A1 * | 1/2017 | Gao | G06F 1/1624 |
| 2017/0039997 | A1 * | 2/2017 | An | G09G 5/10 |
| 2017/0103707 | A1 * | 4/2017 | Park | G09G 3/2003 |
| 2017/0162094 | A1 * | 6/2017 | Jee | G09G 3/006 |
| 2017/0192598 | A1 * | 7/2017 | Seen | G02B 6/0031 |
| 2017/0221450 | A1 * | 8/2017 | Kim | G06F 1/1637 |
| 2017/0270841 | A1 * | 9/2017 | An | G09G 5/005 |
| 2017/0294156 | A1 * | 10/2017 | Pyo | G09G 3/2003 |
| 2017/0308226 | A1 * | 10/2017 | Yoo | G06F 3/03545 |
| 2017/0309216 | A1 * | 10/2017 | Jiao | G09G 5/10 |
| 2017/0358275 | A1 * | 12/2017 | Klement | G06F 16/951 |
| 2018/0025468 | A1 * | 1/2018 | Kim | G06T 3/20 345/682 |
| 2018/0053463 | A1 * | 2/2018 | Kong | G09G 3/20 |
| 2018/0088797 | A1 * | 3/2018 | Mcatee | G08B 5/36 |
| 2018/0088892 | A1 * | 3/2018 | Park | G09G 3/3233 |
| 2018/0089861 | A1 * | 3/2018 | Klement | G06T 11/001 |
| 2018/0173399 | A1 * | 6/2018 | Seo | G06F 3/0482 |
| 2018/0348846 | A1 * | 12/2018 | Lee | G06F 1/3218 |
| 2019/0114963 | A1 * | 4/2019 | Choi | G09G 3/3225 |
| 2019/0334619 | A1 * | 10/2019 | Aoyama | G06V 10/22 |
| 2020/0013986 | A1 * | 1/2020 | Li | H10K 59/124 |
| 2020/0135074 | A1 * | 4/2020 | Wooster | G09G 3/006 |
| 2020/0249898 | A1 * | 8/2020 | Ko | G06F 3/04886 |
| 2020/0319673 | A1 * | 10/2020 | Lee | H04M 1/0243 |
| 2020/0404591 | A1 * | 12/2020 | Kim | H04W 52/0251 |
| 2020/0409534 | A1 * | 12/2020 | Xia | G06F 3/04817 |
| 2021/0019441 | A1 * | 1/2021 | Neves Creto | H04L 51/224 |
| 2021/0027685 | A1 * | 1/2021 | Kang | G09G 5/377 |
| 2021/0056669 | A1 * | 2/2021 | Dichenko | G06V 10/758 |
| 2021/0256668 | A1 * | 8/2021 | Toguchi | G06T 5/92 |
| 2021/0271378 | A1 * | 9/2021 | Kim | G06F 3/0482 |
| 2021/0304701 | A1 * | 9/2021 | Choi | G09G 3/2081 |
| 2021/0335287 | A1 * | 10/2021 | Chen | G06F 9/451 |
| 2021/0349619 | A1 * | 11/2021 | Crowley | G06F 1/3287 |
| 2021/0375157 | A1 * | 12/2021 | Sundstrom | A61B 5/681 |
| 2022/0013053 | A1 * | 1/2022 | Kim | G06F 1/3265 |
| 2022/0139330 | A1 * | 5/2022 | Kwon | G06F 3/1431 345/204 |
| 2022/0157910 | A1 | 5/2022 | Cho | |
| 2022/0237479 | A1 * | 7/2022 | Yildiz | G06F 11/3058 |
| 2022/0324324 | A1 * | 10/2022 | Sohn | B60K 35/81 |
| 2022/0332191 | A1 * | 10/2022 | Wu | G09G 5/10 |
| 2022/0342514 | A1 * | 10/2022 | Chao | G06F 3/0362 |
| 2023/0037241 | A1 * | 2/2023 | Wang | H10K 59/95 |
| 2023/0142900 | A1 * | 5/2023 | Orio | G09G 3/3291 345/694 |
| 2023/0143180 | A1 * | 5/2023 | Song | G09G 3/3233 345/691 |
| 2023/0145126 | A1 * | 5/2023 | Uhm | G09G 3/20 345/589 |
| 2023/0161470 | A1 * | 5/2023 | Crowley | G06F 1/3296 715/771 |
| 2023/0239396 | A1 * | 7/2023 | Wu | G06F 1/1677 455/566 |
| 2023/0252931 | A1 * | 8/2023 | Kim | G09G 5/10 345/55 |
| 2023/0326393 | A1 * | 10/2023 | Huang | G06F 9/451 345/55 |
| 2024/0337402 | A1 * | 10/2024 | Read | G02B 6/0068 |

FOREIGN PATENT DOCUMENTS

| | | | |
|---|---|---|---|
| KR | 10-2017-0100951 | | 9/2017 |
| KR | 10-2020-0050696 | | 5/2020 |
| KR | 102207190 | B1 | 1/2021 |
| KR | 10-2264710 | | 6/2021 |
| KR | 10-2022-0015847 | | 2/2022 |
| KR | 20220015847 | A | 2/2022 |
| KR | 20220168009 | A | 12/2022 |
| KR | 10-2621809 | B1 | 1/2024 |
| WO | WO 2018/182287 | A1 | 10/2018 |
| WO | WO 2022/015079 | A1 | 1/2022 |

OTHER PUBLICATIONS

[Display Knowledge] Let's learn about gamma!, Online: https://news.samsungdisplay.com/1869, Dec. 19, 2014, 1 page.

* cited by examiner

ELECTRONIC DEVICE AND METHOD FOR DISPLAYING SCREEN INCLUDING VISUAL OBJECT

CROSS-REFERENCE TO RELATED APPLICATIONS

This application is a continuation of International Application No. PCT/KR2024/000665 designating the United States, filed on Jan. 12, 2024, in the Korean Intellectual Property Receiving Office and claiming priority to Korean Patent Application Nos. 10-2023-0023962, filed on Feb. 22, 2023, and 10-2023-0034991, filed on Mar. 17, 2023, in the Korean Intellectual Property Office, the disclosures of each of which are incorporated by reference herein in their entireties.

BACKGROUND

Field

The disclosure relates to an electronic device and method for displaying a screen including a visual object.

Description of Related Art

An electronic device may include a display panel. For example, the electronic device may include at least one processor operably coupled to the display panel. For example, the electronic device may display an image on the display panel based on the at least one processor.

SUMMARY

An electronic device may comprise memory storing instructions. The electronic device may comprise at least one processor comprising processing circuitry. The electronic device may comprise a display panel including a plurality of pixels. The instructions, when executed by at least one processor individually and/or collectively, may cause the electronic device to: display, through the display panel, a screen for a low-power state including at least one visual object; identify an event for displaying a visual object in the screen while displaying the screen; identify an on-pixel ratio (OPR) of the visual object in response to the event; and based on changing a first value representing an attribute of the visual object to a second value lower than the first value in response to the OPR being greater than a reference OPR, display, through the display panel, the screen including the visual object.

A method performed by an electronic device may comprise displaying, through a display panel of the electronic device, a screen for a low-power state including at least one visual object. The method may comprise identifying an event for displaying a visual object in the screen while displaying the screen. The method may comprise identifying an on-pixel ratio (OPR) of the visual object in response to the event. The method may comprise, based on changing a first value representing an attribute of the visual object to a second value lower than the first value in response to the OPR being greater than a reference OPR, displaying, through the display panel, the screen including the visual object.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Terms used in the present disclosure are used simply to describe an example embodiment, and are not intended to limit the scope of any embodiment. A singular expression may include a plural expression unless it is clearly meant differently in the context. The terms used herein, including a technical or scientific term, may have the same meaning as generally understood by a person having ordinary knowledge in the technical field described in the present disclosure. Terms defined in a general dictionary among the terms used in the present disclosure may be interpreted with the same or similar meaning as a contextual meaning of related technology, and unless clearly defined in the present disclosure, it is not interpreted in an ideal or excessively formal meaning. In some cases, even terms defined in the present disclosure should not be interpreted to exclude embodiments of the present disclosure.

In various example embodiments of the present disclosure described below, a hardware approach is described as an example. However, since the various embodiments of the present disclosure include technology that use both hardware and software, the various embodiments of the present disclosure do not exclude a software-based approach.

In addition, in the present disclosure, in order to determine whether a specific condition is satisfied or fulfilled, an expression of more than or less than may be used, but this is only a description for expressing an example, and does not exclude description of more than or equal to or less than or equal to. A condition described as 'more than or equal to' may be replaced with ' more than', a condition described as 'less than or equal to' may be replaced with 'less than', and a condition described as 'more than or equal to and less than' may be replaced with 'more than and less than or equal to'. In addition, hereinafter, 'A' to 'B' may refer, for example, to at least one of elements from A (including A) and to B (including B).

Figure 1:
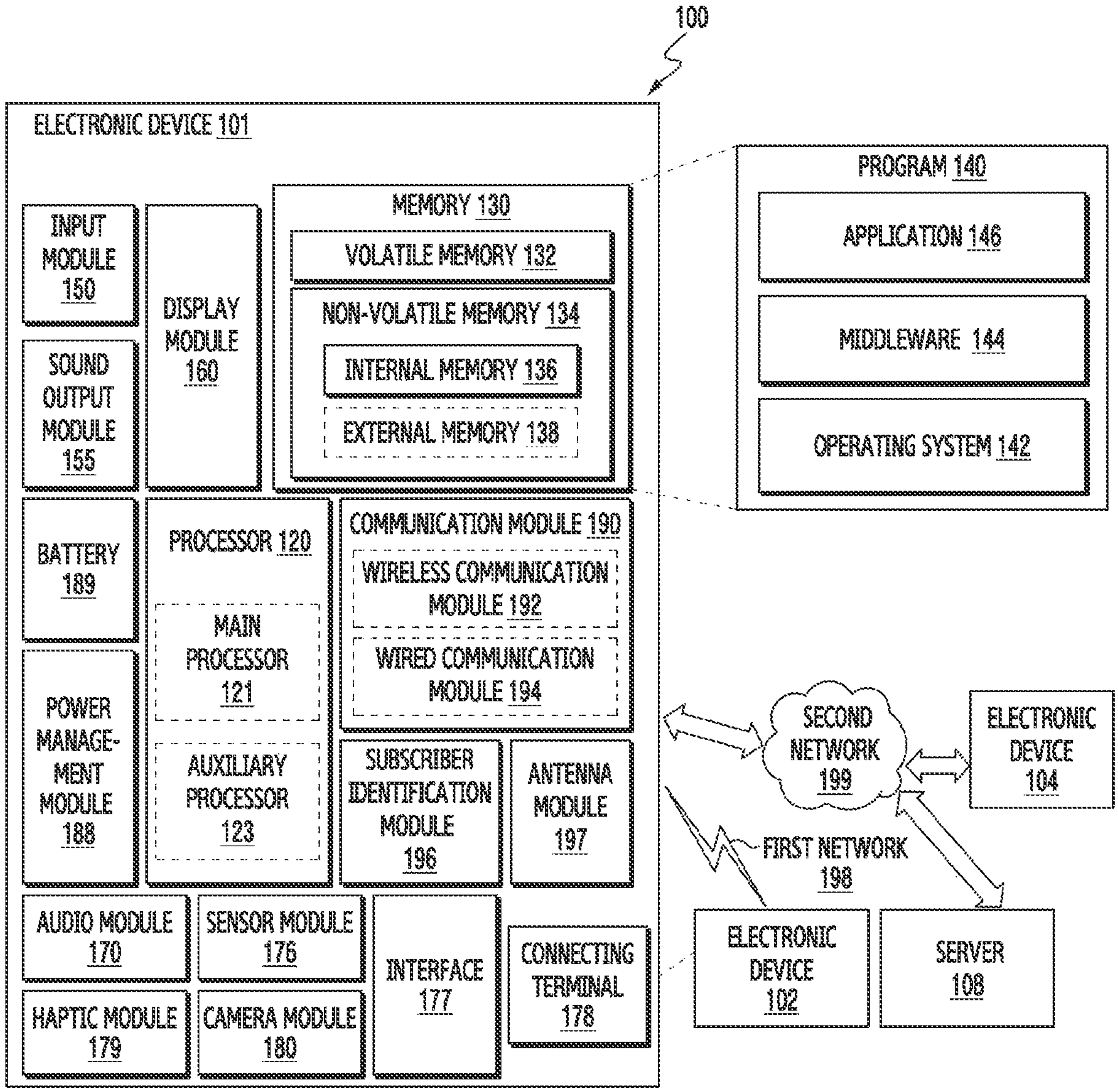
FIG. 1 is a block diagram illustrating an example electronic device in a network environment according to various embodiments.

FIG. 1 is a block diagram illustrating an example electronic device in a network environment according to various embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions. The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Hereinafter, in the present disclosure, a low power state may refer, for example, to a state in which a processor (hereinafter, a processor 310 of FIG. 3) is in a sleep state in at least a portion of while a visual object is displayed on the display panel (hereinafter, a display panel 340 of FIG. 3). For example, the low power state may be referred to as an always on display (AOD) mode. For convenience of description, the low power state of the present disclosure assumes that the processor is in the sleep state. However, the present disclosure is not limited thereto. For example, the low power state may represent a state in which the display panel operates at a minimum refresh rate (e.g., 1 Hz) while the visual object is displayed on the display panel.

The electronic device may display an image through the display panel using a display driving circuit based on image information obtained from the processor. In a method of displaying the image, the image may be displayed through the display panel based on a command mode or a video mode. For example, even in case that the image is displayed through a screen for the low power state, modes as described above may be used. A method of displaying the image through the screen for the low power state based on the command mode may, for example, be as follows. For example, the processor before switching to the sleep state (e.g., active state) may transmit the image information to the display driving circuit. The display driving circuit may store the image information in memory (e.g., graphic random access memory (GRAM)) in the display driving circuit. After the processor is switched to the sleep state, the display driving circuit may display the image through the display panel by scanning the image information in the memory. In this case, the processor may be in the sleep state. A method of displaying the image through the screen for the low power state based on the video mode may, for example, be as follows. Unlike the command mode, the video mode may represent a mode for displaying the image without using the memory. For example, the video mode may represent a mode provided by the display driving circuit that does not include the memory. For example, the display driving circuit may display the image information obtained from the processor through the display panel. In this case, the processor may be in the low power state operating at the minimum refresh rate.

Figure 2:
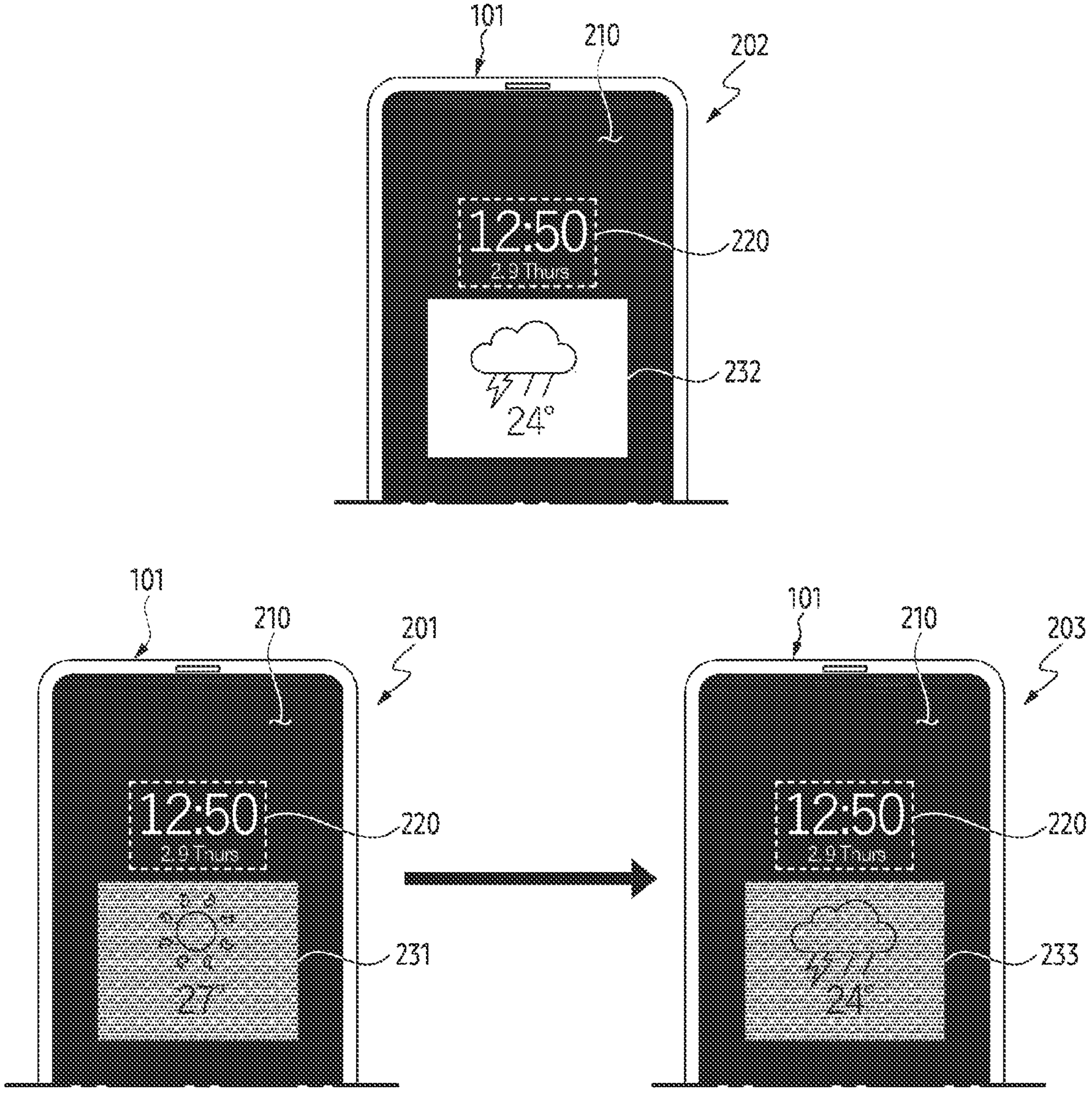
FIG. 2 is a diagram illustrating an example of displaying a screen including a visual object having a transparency adjusted based on an on-pixel ratio (OPR) in a low power state according to various embodiments.

FIG. 2 is a diagram illustrating an example of displaying a screen including a visual object having a transparency adjusted based on an on-pixel ratio (OPR) in a low power state according to various embodiments.

The low power state may be referred to as the AOD mode. The OPR may represent the ratio of at least some pixels to be used to display the visual object among a plurality of pixels (or subpixels) included in a display panel (e.g., a display panel 340 of FIG. 3 below) displaying the screen. For example, the OPR may represent a ratio of a sum of RGB values of each of the at least some pixels for a case in which entire of the plurality of pixels display white (e.g., RGB value (or gradation, grayscale) is maximum). This is described in greater detail below with reference to FIG. 13.

Referring to FIG. 2, examples 201, 202 and 203 in which an electronic device 101 displays a plurality of visual objects on a screen 210 in a state of displaying the screen 210 through the display panel in the low power state are illustrated. For example, the screen 210 may represent a screen for the low power state. Hereinafter, the screen 210 may be referred to as an AOD screen. For example, the plurality of visual objects may include a visual object 220 displaying time and visual objects 231, 232, and 233 displaying weather. The visual objects 220, 231, 232, and 233 may include a widget displayed on the screen 210 for the low power state. For example, the visual object 231 may represent the widget displayed on the screen 210 based on an image obtained from a first software application. However, the present disclosure is not limited thereto. For example, the visual object 231 may include an icon that may be displayed on the screen 210 based on the image obtained from the first software application. For example, the icon may represent a visual object for displaying a state change of the first software application operated in a background in the low power state. For example, the icon may represent a visual object for displaying a lock state of the electronic device 101 on the AOD screen. For example, the icon may represent a visual object for unlocking the lock state of the electronic device 101 on the AOD screen. For example, the icon may represent a visual object for representing information on a video or music currently being played. An example is described in greater detail below with reference to FIG. 19. For example, the first software application may represent a software application that provides information on the weather. However, the present disclosure is not limited thereto.

In the example 201, the electronic device 101 may display the screen 210 including the visual object 220 displaying the time and the visual object 231 displaying the weather in the low power state. For convenience of explanation, the example 201 illustrates the screen 210 displaying the visual object 231 whose transparency is adjusted based on a second software application, but the present disclosure is not limited thereto. For example, the screen 210 may include only the visual object 220 representing the time. For example, the second software application may include a software application for setting the screen 210 for the low power state.

In the example 201, the electronic device 101 may be in a state of displaying the screen 210 including the visual object 220 and the visual object 231 in the low power state. In this case, the electronic device 101 may identify an event for the visual object 231 in the screen 210. For example, the event may include at least one of a display (or addition) of the visual object, activation of an AOD function, a designated interval (e.g., 1 minute), a change (or update) of at least a portion of the visual object, or an event that changes a theme of the screen. The screen on which the theme is changed may include screens that the electronic device 101 may display. In the example 201, the event is in a state in which the visual object 231 is already displayed, and may represent an event for the changing of at least a portion of the visual object. In case of identifying the event, a processor (e.g., a processor 310 of FIG. 3) of the electronic device 101 may change from the low power state to a wake-up state. For example, the wake-up state may include a state in which the processor is driven. The wake-up state may represent a state in which the processor drives through a reproduction rate higher than the minimum refresh rate.

In the example 201, the electronic device 101 may identify the visual object 232 of the example 202 to be displayed through the screen 210 based on the event. As in the example 202, the electronic device 101 may identify that the screen 210 including the visual object 232 and the visual object 220 changed from the visual object 231 will be displayed, based on the event. The visual object 232 may be identified based on the image obtained from the first software application. However, the visual object 232 included in the screen 210 of the example 202 may represent a visual object in which the OPR has a higher OPR than a reference OPR. For example, the reference OPR may be identified based on power used to display the screen 210 in the low power state. For example, the reference OPR may be set to at least one value between 10% and 15%. However, the present disclosure is not limited thereto.

Referring to the example 202, in case that the visual object 232 having the OPR higher than the reference OPR is displayed, burn-in may occur on the display panel of the electronic device 101. In addition, in case that the visual object 232 having the OPR higher than the reference OPR is displayed, power consumption of the electronic device 101 may increase. In addition, in case that the state in which the visual object 232 having the OPR higher than the reference OPR is displayed changes to a state in which a screen different from the screen 210 (e.g., a lock screen or home screen) is displayed, an afterimage may be formed on the display panel of the electronic device 101.

In order to address the above-described problem, the electronic device 101 may identify the OPR of the visual object 232 before displaying the visual object 232. For example, the electronic device 101 may identify the OPR of the visual object 232 (or the image) using the second software application based on an image representing the visual object 232 obtained from the first software application. In addition, the electronic device 101 may identify an alpha value representing a transparency of the visual object 232 based on the image. For example, the electronic device 101 may identify the alpha value of the visual object 232 as a first value.

For example, the electronic device 101 may identify whether the OPR of the visual object 232 exceeds the reference OPR using the second software application. For example, the electronic device 101 may change the first value to a second value lower than the first value in response to the OPR exceeding the reference OPR. The electronic device 101 may display a visual object having the changed second value through the screen 210 based on changing the value representing the transparency of the visual object 232 to the second value. Referring to the example 203, the electronic device 101 may display the screen 210 including the visual object 233 and the visual object 220 having the second value lower than the visual object 232. In this case, a transparency of the visual object 220 may be maintained. An OPR of the visual object 233 having the second value may be lower than the OPR of the visual object 232 having the first value. In other words, the OPR may be adjusted based on the alpha value. An example of adjusting the OPR based on the changed alpha value is described in greater detail below with reference to FIG. 13.

For example, the visual object 233 may have a lower brightness level shown from outside than the visual object 232. For example, the OPR may be lowered by adjusting the transparency of the visual object. Since the visual object 233 whose brightness level is lowered according to the changed OPR is displayed, burn-in and the afterimage may not occur on the display panel of the electronic device 101. In addition, since an OPR value for display in the electronic device 101 decreases, the power consumption of the electronic device 101 may be reduced.

In FIG. 2, an example of adjusting the transparency as an attribute of the visual object is illustrated, but the present disclosure is not limited thereto. For example, the attribute may include at least one of sampling for an OPR for displaying the visual object, a size of the visual object, an RGB value of the visual object, the transparency of the visual object, or luminance for the visual object. The disclosure may include adjusting the attribute.

Referring to the above, in case of displaying a visual object (e.g., the widget) for a specific software application through the AOD screen, as a state of the visual object is changed, it may be necessary to dynamically adjust an OPR for pixels to be used to display the visual object. For example, that the state of the visual object is changed may include at least one of the case that the visual object is not displayed and then displayed in response to the event, the case that the visual object is displayed and then displayed a visual object in which at least a portion of the visual object has changed in response to the event, or the case that the theme for the screen is changed in response to the event. The screen on which the theme is changed may include the screens that the electronic device 101 may display.

As described in example 202, in case that the OPR of the visual object 232 to be displayed exceeds the reference OPR, the burn-in and the afterimage may occur in the display panel as the screen 210 for the low power state is displayed. In addition, in case that the OPR exceeds the reference OPR, a problem in which the power consumption of the electronic device 101 increases in the low power state may occur.

For example, the burn-in may occur as a life of a light emitting element of each of a plurality of subpixels included in the display panel decreases. For example, each of the plurality of subpixels may include a light emitting element for displaying red (R), green (G), or blue (B). Compared to the light-emitting element for displaying R or the light-emitting element for displaying G, a life of the light-emitting element for displaying B is short. Accordingly, in case that the screen 210 including the visual object 232 is displayed for a long time, the burn-in may occur.

For example, depending on a hysteresis characteristic of the display panel, an instantaneous afterimage may occur. The instantaneous afterimage is a phenomenon in which a screen displayed in the past affects a currently changed screen in case that a state of the display panel is instantaneously changed.

For example, a ratio of at least some pixels to be used to display a specific visual object among entire pixels included in the display panel may be defined as the OPR. The OPR may represent a ratio of a sum of RGB values displayed by the at least some pixels for a case that each of the entire pixels displays white. For example, the white may represent a case in which each of a gradation (or grayscale) of R, a gradation (or grayscale) of G, and a gradation (or grayscale) of B are maximized and/or increased. For example, the gradation (or grayscale) may be formed at a level of 256 having a range of 0 to 255. In case that the gradation (or grayscale) value is 0, it may represent the darkest color, and in case that the gradation (or grayscale) is 255, it may represent the brightest color. The white color may represent a state in which it is R (255), G (255), or B (255). Red may represent a state in which it is R (255), G (0), and B (0). For example, assuming a case that only one pixel exists, an OPR for displaying the red may be 33.3%. In other words, in case that many pixels among the entire pixels are turned on or in case that the gradation (or grayscale) value of each RGB increases, the OPR may increase. In case that the OPR increases, the power consumption may increase. However, since the low power state is a state which is driven through limited power consumption, the OPR for displaying the visual object needs to be adjusted below the reference OPR. In general, the OPR may sample the number of pixels to be used to display the visual object in order to be adjusted below the reference OPR. For example, the sampling may represent scaling the number of pixels to be used to display the visual object. For example, in case that the number of pixels to be used to display the visual object is 100 and is sampled at 75%, the number of pixels to be used to display the visual object may be adjusted to 75. For example, in case that an OPR of the image representing the visual object exceeds the reference OPR, the OPR of the image may be sampled at 75%. In case that the sampled OPR exceeds the reference OPR, the OPR of the visual object may be adjusted to a value less than or equal to the reference OPR by reducing a size of the image or reducing a value of the gradation (or grayscale) for displaying the image.

Referring to FIG. 2, the electronic device 101 may be set to display a visual object (e.g., the widget) related to a specific software application (e.g., the first software application) in a state of being displayed through the screen 210 for the low power state. As in the example 202, the visual object may be displayed on the screen 210 without considering the OPR. Accordingly, there may be a problem in that the power consumption increases and the burn-in and the afterimage occur. A specific software application may provide limited or no visual object (e.g., the widget) displayed through the screen 210 for the low power state.

The disclosure provides a device and method for displaying the visual object (e.g., the widget) in the screen for the low power state using a software application (e.g., the second software application) for setting the screen for the low power state. The device and method according to an embodiment of the present disclosure may dynamically change the OPR of the visual object using the image representing the visual object obtained from the first software application in response to the event based on the second software application. The device and method according to the present disclosure may display at least one visual object for an arbitrary software application through the screen for the low power state. In addition, the device and method according to the present disclosure may reduce a frequency of occurrence of the burn-in and the afterimage and may reduce the power consumption, by dynamically adjusting an OPR of the at least one visual object.

Figure 3:
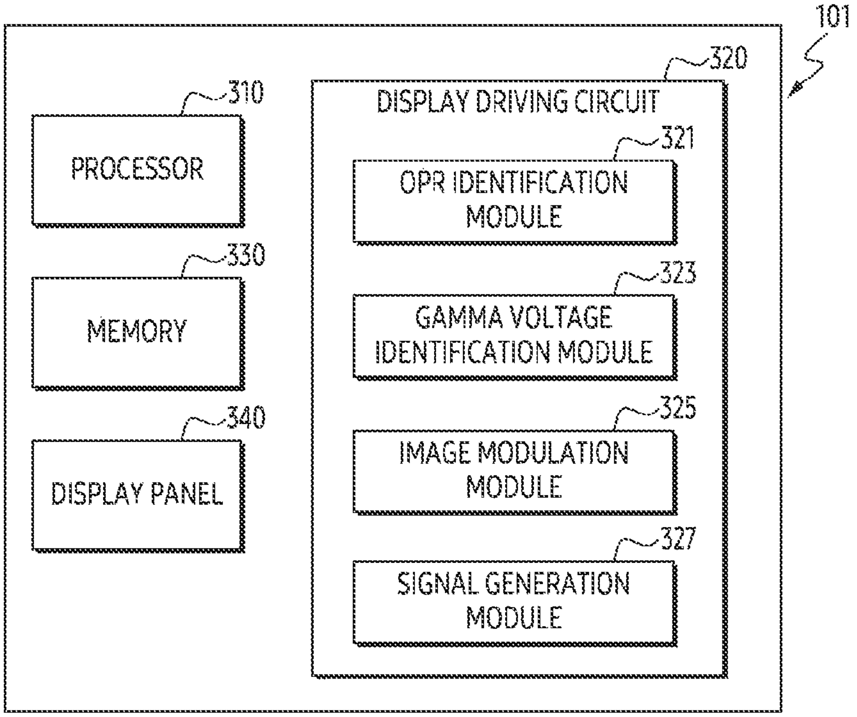
FIG. 3 is a block diagram illustrating an example configuration of an electronic device according to various embodiments.

FIG. 3 is a block diagram illustrating an example configuration of an electronic device according to various embodiments.

Referring to FIG. 3, an electronic device 101 may include a processor (e.g., including processing circuitry) 310, a display driving circuit 320, a memory 330, and a display panel 340. The processor 310 may include at least a portion of a processor 120 of FIG. 1. The memory 330 may include at least a portion of a memory 130 of FIG. 1. The display driving circuit 320 and the display panel 340 may include at least a portion of the display module 160. The display driving circuit 320 may be referred to as a DDI or a control circuit.

Referring to FIG. 3, the processor 310 may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions. The processor 310 may be used to obtain an image. For example, the processor 310 may obtain the image using a software application. For example, the image may include a visual object displayed on a screen for a low power state of the electronic device 101. The processor 120 may provide the image to the display driving circuit 320. For example, the processor 120 may provide information for displaying the visual object to the display driving circuit 320. For example, the information for displaying the visual object may include an OPR of the visual object changed based on a transparency from an OPR of the visual object represented by the image. The information for displaying the visual object may include information instructing to identify the changed OPR of the visual object based on the OPR of the visual object represented by the image. The display driving circuit 320, which has received information instructing to identify the changed OPR of the visual object, may identify the changed OPR of the visual object based on the image. For convenience of explanation, hereinafter, it is described based on an example in which the processor 310 transmits the changed OPR of the visual object to the display driving circuit 320.

For example, the processor 310 may include a central processing unit (CPU), a graphics processing unit (GPU), or a display controller (or a display processing unit (DPU)) configured to process an image obtained from volatile memory in a format suitable for the display panel 340. For example, the processor 310 may be operatively (or operably) coupled with the display driving circuit 320. For example, that the processor 310 may be operatively (or operably) coupled with the display driving circuit 320 may refer to the processor 310 being directly connected to the display driving circuit 320. For example, that the processor 310 may be operatively (or operably) coupled with the display driving circuit 320 may refer to the processor 310 being connected to the display driving circuit 320 through another component of the electronic device 101. For example, the processor 310 may be connected to the display driving circuit 320 through an interface. For example, an interface may be used for transmission of the image from the processor 310 to the display driving circuit 320. For example, the interface may be a display serial interface (DSI) of a mobile industry process interface (MIPI) alliance. However, the present disclosure is not limited thereto. For example, that the processor 310 may be operatively (or operably) coupled with the display driving circuit 320 may represent that the display driving circuit 320 operates based on instructions executed by the processor 310. For example, that the processor 310 may be operatively (or operably) coupled with the display driving circuit 320 may represent that the display driving circuit 320 is controlled by the processor 310. For example, the processor 310 may display the image on the display panel 340 using the display driving circuit 320 based on a video mode of the DSI. For example, the processor 310 and the display driving circuit 320 may be configured with at least one processor.

For example, the display driving circuit 320 may process the image based on a characteristic of the image and/or a characteristic of the display panel 340. For example, the display driving circuit 320 may provide signals for displaying the image to the display panel 340. For example, the display driving circuit 320 may be operatively (or operably) coupled with the display panel 340. For example, that the display driving circuit 320 is operatively (or operably) coupled with the display panel 340 may refer to the display driving circuit 320 being connected to the display panel 340. For example, that the display driving circuit 320 is operatively (or operably) coupled with the display panel 340 may refer to the display panel 340 being controlled by the display driving circuit 320. However, it is not limited thereto.

For example, the display driving circuit 320 may include components for displaying the visual object (e.g., a widget) through the display panel 340 on the screen for the low power state. For example, the display driving circuit 320 may include an OPR identification module 321, a gamma voltage identification module 323, an image modulation module 325, and a signal generation module 327. Each of these modules may include various circuitry and/or executable program instructions.

For example, the OPR identification module 321 may identify the OPR of the visual object obtained from the processor 310. For example, the OPR identification module 321 may identify the OPR of the visual object included in the image by obtaining data on the OPR of the visual object from the processor 310 or using the image obtained from the processor 310. In addition, the OPR identified by the OPR identification module 321 may be provided to the gamma voltage identification module 323 and the image modulation module 325.

For example, the gamma voltage identification module 323 may obtain a plurality of gamma voltages based on at least some of the set gamma curves. The gamma may be a parameter for representing a correlation between a brightness level (or gray level) of a signal input to the display panel 340 and luminance on a screen displayed through the display panel 340. Depending on the gamma value, a tone of brightness displayed even on the same screen may change. For example, in case that the gamma value is 1, the brightness of the input signal and the brightness output on the screen may be the same. In case that the gamma value is greater than 1, the brightness output on the screen may be brighter than the brightness of the input signal. In case that the gamma value is less than 1, the brightness output on the screen may be darker than the brightness of the input signal. The gamma curve may refer to a line representing luminance according to gradation (or grayscale) that changes depending on the gamma value. For example, the gamma voltage identification module 323 may change the gamma curve by changing the maximum gamma voltage and/or the minimum gamma voltage. For example, based on the OPR obtained from the OPR identification module 321, the gamma voltage identification module 323 may provide information on the plurality of gamma voltages to the signal generation module 327.

For example, the image modulation module 325 may modulate or modify the image obtained from the processor 310 based on the OPR obtained from the OPR identification module 321. For example, the image modulation module 325 may provide information on the modulated (or modified) image to the signal generation module 327.

For example, the signal generation module 327 may generate signals based at least in part on information obtained from the gamma voltage identification module 323 and the image modulation module 325. For example, the signals may be obtained by converting the information obtained from the gamma voltage identification module 323 and/or the information obtained from the image modulation module 325. For example, the signal generation module 327 may include a decoder for converting the information. The signal generation module 327 may transmit the obtained signals to the display panel 340.

For example, the display panel 340 may display a screen based on the signals obtained from the signal generation module 327. For example, the screen may include at least one of the image, the visual object, and a user interface. For example, the display panel 340 may include a plurality of pixels (or subpixels). For example, the display panel 340 may display the screen including the visual object based on at least some of the plurality of pixels.

For example, the memory 330 may include image information obtained from a specific software application (e.g., a first software application) and/or the second software application. For example, the memory 330 may include one or more instructions that cause an operation of the at least one processor (e.g., the processor 310, the display driving circuit 320), when executed by the at least one processor. For example, in the memory 330, the one or more instructions (or commands) representing calculation and/or operation to be performed by the at least one processor of the electronic device 101 on data may be stored. A set of one or more instructions may be referred to as a program, firmware, operating system, process, routine, sub-routine and/or application. Hereinafter, that the software application was installed in the electronic device 101 may refer, for example, to the one or more instructions being provided in a form of a software application are stored in the memory 330 and the one or more applications being stored in an executable format (e.g., a file having an extension designated by the operating system of the electronic device 101) by the at least one processor of the electronic device 101. According to an embodiment, the electronic device 101 may perform an operation according to an embodiment of the present disclosure by executing the one or more instructions stored in the memory 330.

In case that the processor 310 is in a sleep state, the low power state may represent a state in which the screen including the visual object is displayed on the display panel 340. However, the present disclosure is not limited thereto. For example, the low power state may represent a state in which the display panel 340 operates at a minimum refresh rate (e.g., 1 Hz) while the screen including the visual object is displayed on the display panel 340. Hereinafter, for convenience of explanation, the low power state of the present disclosure assumes that the processor is in the sleep state.

Figure 4:
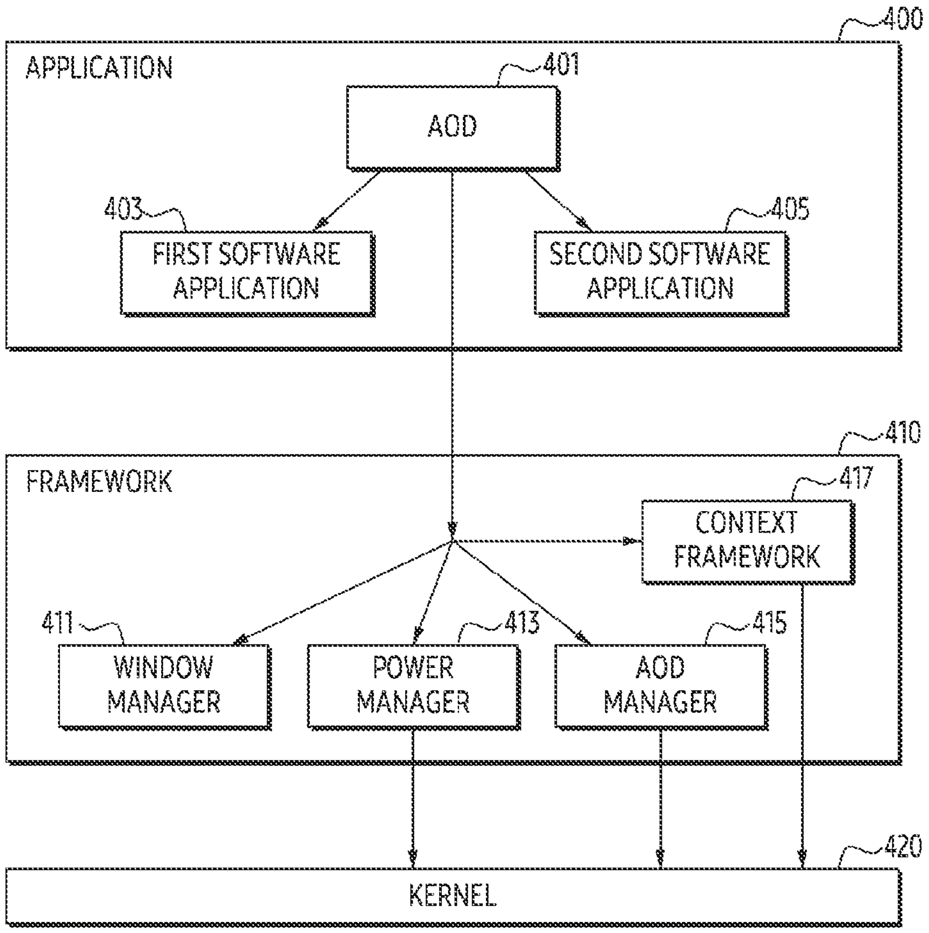
FIG. 4 is a diagram illustrating an example architecture for supporting a function of displaying a screen in a low power state according to various embodiments.

FIG. 4 is a diagram illustrating an example architecture for supporting a function of displaying a screen in a low power state according to various embodiments.

The low power state may be referred to as the AOD mode. For example, the function of displaying the screen in the low power state may be referred to as AOD (or AOD function). The architecture may represent a simplified architecture of an electronic device 101 for supporting the AOD. However, the present disclosure is not limited thereto. For example, the electronic device 101 may further include or may less include other components in addition to a component included in the architecture of FIG. 4. In addition, the electronic device 101 may use an architecture configured in a structure different from that of the architecture in FIG. 4.

Referring to FIG. 4, the architecture may include an application 400, a framework 410, and a kernel 420. Although not shown in FIG. 4, libraries or a hardware abstraction layer may be further included between the framework 410 and the kernel 420. For example, programs installed in the electronic device 101 may be classified into the application 400, the framework 410, and/or any one layer among the hardware abstraction layers, based on a target.

For example, programs classified as the framework 410 may provide an executable application programming interface (API) based on another program. For example, a program classified as the application 400 may cause execution of a function supported by the programs classified as the framework 410, by calling the API.

For example, the application 400 may represent a layer that performs interaction with a user. The application 400 may include An AOD software application 401, a first software application 403 for providing weather information, and a second software application 405 for setting of a screen for the AOD. However, the present disclosure is not limited thereto. For example, the application 400 may further include other software applications. In addition, the first software application 403 is an example and may be a software application for providing another service. For example, the software application for providing the other service may include a software application for a calendar, a note, or a clock. For example, the first software application 403 may refer to a 3rd party application. For example, the 3rd party application may refer to a software application provided by the 3rd party rather than a manufacturer (e.g., a 1st party) of the electronic device 101 or a telecommunication company (e.g., a 2nd party) that provides a communication service of the electronic device 101. The 3rd party application may represent a software application installed in the electronic device 101 based on an installation program downloaded through a store that provides the software application. In addition, for convenience of explanation, the second software application 405 is referred to as a software application for setting of the screen (or a screen for the low power state) for the AOD, but is not limited thereto. For example, the second software application 405 may represent a software application for setting of a lock screen as well as a screen for the AOD. For example, the second software application 405 may be related to a software application for changing setting of a user interface (UI) or user experience (UX), including the setting of the AOD screen or the lock screen. For example, the second software application 405 may change setting for displaying the visual object through the AOD screen or the lock screen based on information obtained from the first software application 403. Hereinafter, an operation performed based on the second software application 405 and the first software application 403 is illustrated, but the present disclosure is not limited thereto. For example, an operation performed using the first software application 403 and/or the second software application 405 may be performed by the processor 340.

For example, a plurality of programs may be classified into the framework 410. For example, the framework 410 may include a window manager 411, a power manager 413, an AOD manager 415, and a context framework 417. For example, the window manager 411 may trigger the AOD when the screen is turned on/off in relation to the AOD software application 401. For example, the power manager 413 may control an active matrix organic light emitting diode (AMOLED) low power mode (ALPM) and a hybrid low power mode (HLPM) in relation to the AOD software application 401. For example, the AOD manager 415 may obtain notification information and may set a command for display in relation to the AOD software application 401. For example, the second software application 405 may change the setting of the AOD screen based on execution of the AOD manager 415. In other words, the second software application 405 may change the setting of the AOD screen using a program of the framework 410. The context framework 417 may obtain an AOD on/off state in relation to the AOD software application 401.

For example, the kernel 420 may manage resources of the electronic device 101. The kernel 420 may include drivers for executing a function supported by the programs classified as the framework 410. The kernel 420 may not support the interaction with the user.

The device and method according to the present disclosure may display a visual object included in a screen displayed while executing the AOD function (e.g., the low power state) through the second software application 405. The visual object may be identified based on an image obtained by the second software application 405 from the first software application 403. For example, the image may represent the visual object. The device and method according to the present disclosure may display a screen including the visual object processed using the second software application 405 based on the image while executing the AOD function.

Figure 5A:
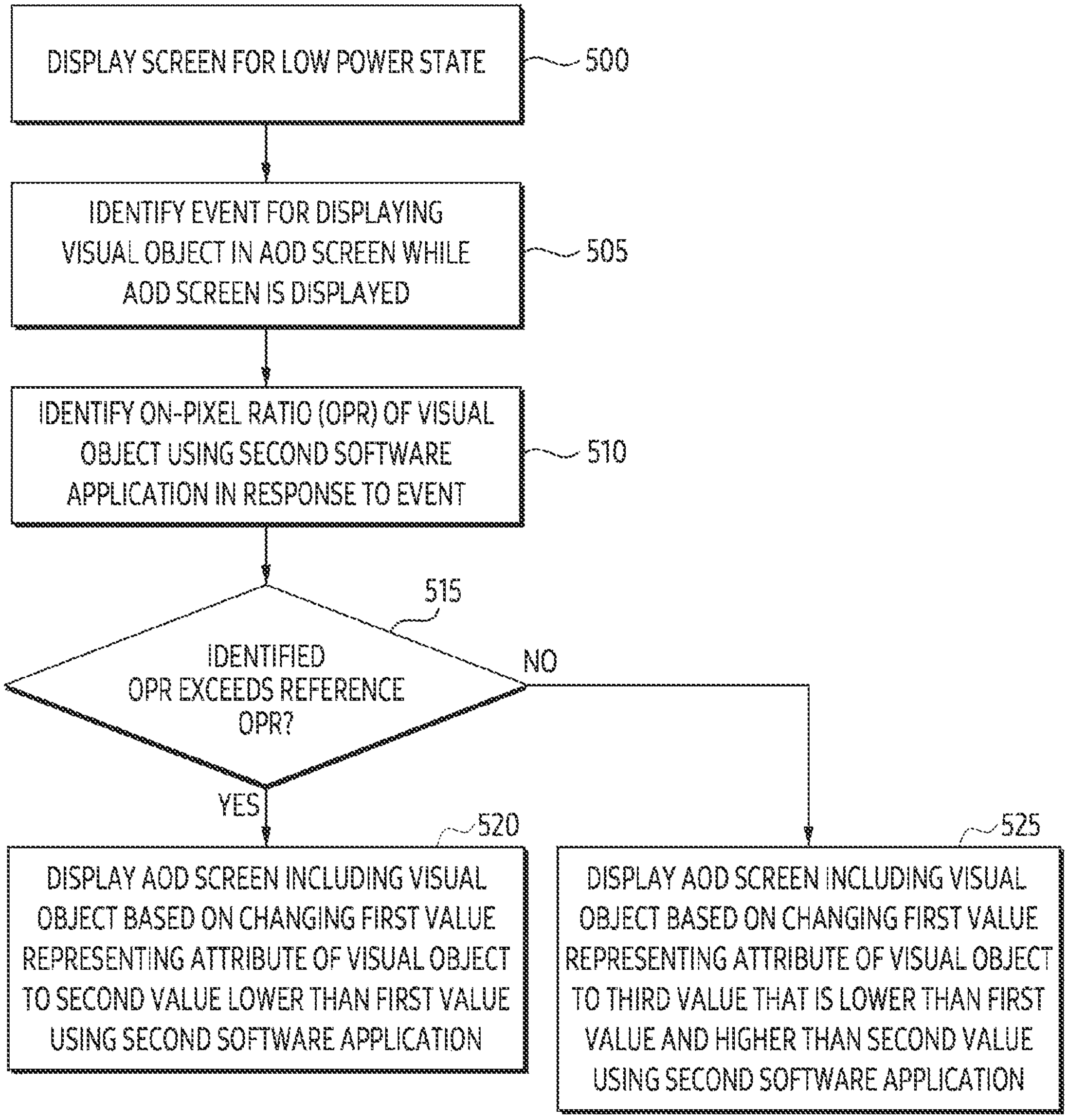
FIG. 5A is a flowchart illustrating an example method of displaying a screen including a visual object having a transparency adjusted based on an OPR in a low power state according to various embodiments.

FIG. 5A is a flowchart illustrating an example operation of displaying a screen including a visual object having a transparency adjusted based on an OPR in a low power state according to various embodiments. The low power state may be referred to as an AOD mode.

The operations of FIG. 5A may be performed by an electronic device 101 of FIG. 3. For example, the operations of FIG. 5A may be performed by at least one processor included in the electronic device 101 of FIG. 3. For example, the at least one processor may include a processor 310 and a display driving circuit 320 of FIG. 3.

Referring to FIG. 5A, in operation 500, the electronic device 101 may display a screen for the low power state. The screen for the low power state may be referred to as an AOD screen. For example, the AOD screen may be in a state including at least one visual object. For example, while the electronic device 101 is in the low power state, the AOD screen may be displayed through a display panel 340. In the example of FIG. 5A, the AOD screen displayed in operation 500 may represent an AOD screen that does not include a visual object related to a first software application. For example, the first software application may include a software application that provides weather information. However, the present disclosure is not limited thereto. In the low power state, some (e.g., the processor 310 of FIG. 3) of the at least one processor included in the electronic device 101 may be in a sleep state.

In operation 505, the electronic device 101 may identify an event for displaying the visual object in the AOD screen while the AOD screen is displayed. For example, the electronic device 101 may identify the event. For example, the event may include at least one of a display (or addition) of the visual object, activation of an AOD function, a designated interval, a change (or update) of at least a portion of the visual object, or an event that changes a theme of the screen. An event for displaying (or adding) the visual object, and an event for changing (or updating) at least a portion of the visual object may be identified using the first software application. The screen on which the theme is changed may include screens that the electronic device 101 may display. In the example of FIG. 5A, since the AOD screen is in a state in which the visual object related to the first software application is not displayed, the event may be the event for displaying the visual object. While the electronic device 101 identifies the event using the first software application, a portion (e.g., the processor 310 of FIG. 3) of the at least one processor included in the electronic device 101 may be in a wake-up state switched from the sleep state.

In operation 510, the electronic device 101 may identify the OPR of the visual object using a second software application in response to the event. For example, in response to identifying the event, the electronic device 101 may identify an image obtained from the first software application using the second software application. For example, the electronic device 101 may identify whether the image will be displayed through the AOD screen. An example related to this is described in greater detail below with reference to FIG. 5B. For example, based on identifying the image being displayed through the AOD screen, the electronic device 101 may identify the OPR of the visual object using the second software application. For example, the image may include image information representing the visual object. For example, the second software application may represent a software application for setting of the AOD screen. For example, the second software application may be used for setting of the AOD screen and a screen (e.g., a lock screen) different from the AOD screen.

For example, the electronic device 101 may identify an alpha value representing a transparency of the image using the second software application based on the image. For example, the alpha value of the image may be identified as a first value.

In operation 515, the electronic device 101 may identify whether the identified OPR exceeds a reference OPR. For example, the electronic device 101 may identify whether the OPR exceeds the reference OPR using the second software application. For example, the reference OPR may be identified based on power used to display the AOD screen in the low power state. The OPR of operation 515 may represent an OPR identified based on pixels to be used to display the visual object among a plurality of pixels included in the display panel 340, or an OPR sampled from the identified OPR. An example will be described in greater detail below with reference to FIG. 13. In operation 515, in case that the OPR exceeds the reference OPR, the electronic device 101 may perform operation 520. On the other hand, in case that the OPR is less than or equal to the reference OPR, the electronic device 101 may perform operation 525.

In operation 520, the electronic device 101 may display the AOD screen including the visual object based on changing the first value representing an attribute of the visual object to a second value lower than the first value using the second software application. For example, the attribute may represent a transparency of the visual object. For example, the electronic device 101 may change the first value identified using the second software application to the second value. The electronic device 101 may display the AOD screen including the visual object having the changed second value through the display panel 340. Accordingly, the visual object having the second value may have a lower brightness level compared to the visual object having the first value. In other words, the visual object having the second value may be displayed darker than the visual object having the first value. For convenience of explanation, in FIG. 5A an example of changing the attribute representing the transparency of the visual object is illustrated, but the present disclosure is not limited thereto. For example, the attribute may include at least one of sampling for an OPR for displaying the visual object, a size of the visual object, an RGB value of the visual object, the transparency of the visual object, or luminance for the visual object.

In operation 525, the electronic device 101 may display the AOD screen including the visual object based on changing the first value representing the attribute of the visual object to a third value that is lower than the first value and higher than the second value using the second software application. For example, the attribute may represent the transparency. For example, the electronic device 101 may change the identified first value to the third value using the second software application. The third value may represent a value that is lower than the first value and higher than the second value. The electronic device 101 may display the AOD screen including the visual object having the changed third value through the display panel 340. Accordingly, the visual object having the third value may have a lower brightness level compared to the visual object having the first value. In addition, the visual object having the third value may have a higher brightness level compared to the visual object having the second value. In other words, the visual object having the third value may be darker than the visual object represented by the image provided by the first software application (e.g., the visual object having the first value), and brighter than the visual object having the second value changed based on the second software application. This may be to display the visual object through the AOD screen.

In operation 520 and operation 525, the portion (e.g., the processor 310) of the at least one processor included in the electronic device 101 may switch from the wake-up state to the sleep state after providing information for displaying the visual object (e.g., the visual object having the second value or the third value) whose transparency has been changed to another portion (e.g., the display driving circuit 320). However, the present disclosure is not limited thereto. For example, in case that a display panel (e.g., the display panel 340) operates at a minimum refresh rate based on the portion (e.g., the processor 310) of the at least one processor, the portion may not switch to the sleep state.

Although not illustrated in FIG. 5A, in operation 515, the electronic device 101 may change the attribute of the visual object using the second software application in case that the OPR identified in operation 510 has a value lower than the reference OPR. For example, the reference value may represent a value based on the reference OPR. For example, in case that the reference OPR is 15%, the reference value is 10%, and the identified OPR is less than 5%, the electronic device 101 may change the attribute of the visual object using the second software application. For example, the reference value may be a parameter for identifying the visual object that may be displayed darkly. For example, the electronic device 101 may change the attribute of the visual object in case that the identified OPR of the visual object identified in operation 510 has the value lower than the reference OPR. For example, the change may indicate that the visual object is changed to be displayed brighter. For example, the change may represent a change of an attribute for increasing the OPR value. For example, the attribute may include sampling for the OPR for displaying the visual object, the size of the visual object, the RGB value of the visual object, the transparency of the visual object, or brightness level for displaying the visual object.

In addition, the electronic device 101 may perform an operation to display the visual object brighter even in case that the OPR of the visual object having an attribute changed through operation 520 or operation 525 is lower than the reference value from the reference OPR. For example, the electronic device 101 may identify the OPR of the visual object having changed attribute through operation 520 or operation 525 in response to the event. The electronic device 101 may identify whether the identified OPR is lower than the reference value from the reference OPR. The electronic device 101 may change the attribute of the visual object in response to the identified OPR having a value lower than the reference value. Accordingly, the identified OPR may be changed to a higher value. In other words, the changed OPR may have a higher value than the identified OPR, and the visual object according to this may be displayed brighter.

In FIG. 5A, the AOD screen including the visual object related to the first software application is described, but the present disclosure is not limited thereto. For example, the AOD screen may also include another visual object related to a third software application that is different from the first software application and the second software application. For example, the electronic device 101 may identify another event for displaying the other visual object. In response to the other event, the electronic device 101 may identify another OPR of the other visual object and a fourth value representing a transparency of the other visual object based on the second software application. In response to the other OPR being higher than the reference OPR, the electronic device 101 may change the fourth value representing the transparency of the other visual object to a fifth value lower than the fourth value using the second software application. The electronic device 101 may display the AOD screen including the other visual object having the fifth value. In other words, the AOD screen may include the visual object having the second value (or the third value) and the other visual object having the fifth value.

In addition, in FIG. 5A, one visual object related to the first software application is described as an example, but the present disclosure is not limited thereto. For example, the visual object related to the first software application may include a plurality of visual objects.

Figure 5B:
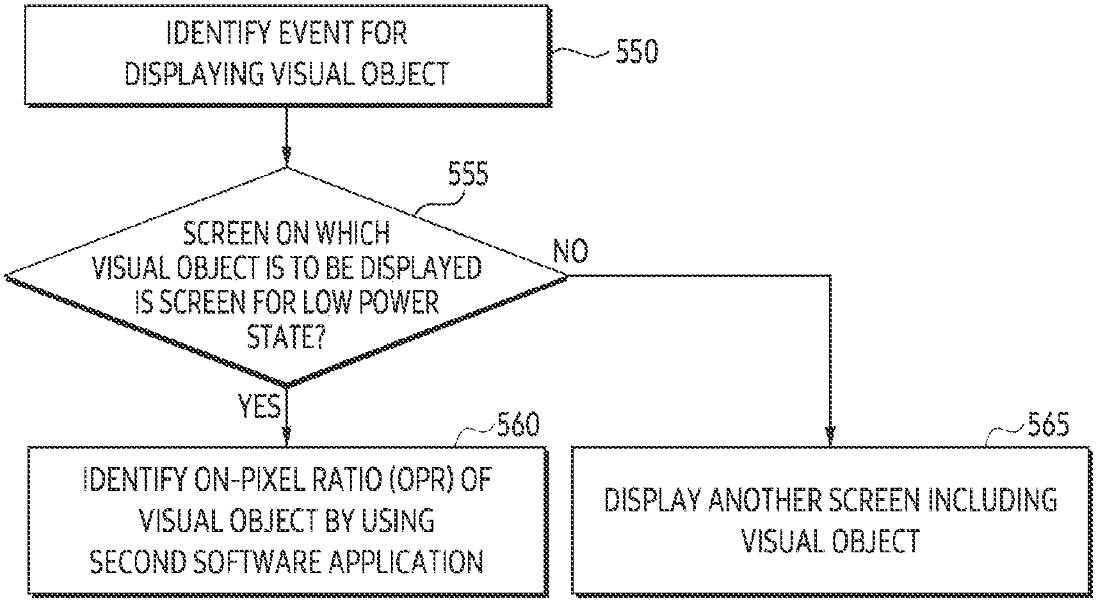
FIG. 5B is a flowchart illustrating an example method of identifying a screen displaying a visual object in response to an event according to various embodiments.

FIG. 5B is a flowchart illustrating an example operation of identifying a screen displaying a visual object in response to an event according to various embodiments.

The operations of FIG. 5B may be performed by an electronic device 101 of FIG. 3. For example, the operations of FIG. 5B may be performed by at least one processor included in the electronic device 101 of FIG. 3. For example, the at least one processor may include a processor 310 and a display driving circuit 320 of FIG. 3. The operations in FIG. 5B may represent an example of a specific operation for operations 505 to 510 in FIG. 5A.

Although not illustrated in FIG. 5B, before performing operation 550, the electronic device 101 may display a screen for a low power state. The screen for the low power state may be referred to as an AOD screen. For example, the electronic device 101 may be in a state of displaying the AOD screen through a display panel 340.

In operation 550, the electronic device 101 may identify an event for displaying the visual object. For example, while the AOD screen is displayed, the electronic device 101 may identify the event for displaying the visual object in the AOD screen. For example, the event may include at least one of a display (or addition) of the visual object, activation of an AOD function, a designated interval, a change (or update) of at least a portion of the visual object, or an event that changes a theme of the screen. An event for displaying (or adding) the visual object, and an event for changing (or updating) at least a portion of the visual object may be identified using the first software application. The screen on which the theme is changed may include screens that the electronic device 101 may display. While the electronic device 101 identifies the event using the first software application, a portion (e.g., the processor 310 of FIG. 3) of the at least one processor included in the electronic device 101 may be in a wake-up state switched from the sleep state.

In operation 555, the electronic device 101 may identify whether a screen on which the visual object is to be displayed is the screen for the low power state. For example, the electronic device 101 may identify whether an image representing the visual object obtained from the first software application is an image to be displayed on the AOD screen using the second software application. In operation 555, the electronic device 101 may perform operation 560 in response to identifying that the screen on which the visual object is to be displayed is the AOD screen. On the other hand, the electronic device 101 may perform operation 565 in response to identifying that the screen on which the visual object is to be displayed is another screen. For example, the other screen may represent a screen for a state different from the low power state. For example, the other screen may include a screen (or a lock screen) for displaying a lock state of the electronic device 101.

In operation 560, the electronic device 101 may identify an OPR of the visual object using the second software application. Operation 560 may be understood substantially the same as operation 510 of FIG. 5A. For example, the electronic device 101 may identify the OPR of the visual object based on the second software application activated in response to the event.

In operation 565, the electronic device 101 may display another screen including the visual object. The other screen may represent the lock screen different from the AOD screen. For example, the other screen may include the visual object. For example, since the visual object is displayed in the state different from the low power state, the visual object may have an OPR based on a deactivated second software application. In other words, the OPR may represent an OPR identified through the image provided by the first software application.

Figure 6A:
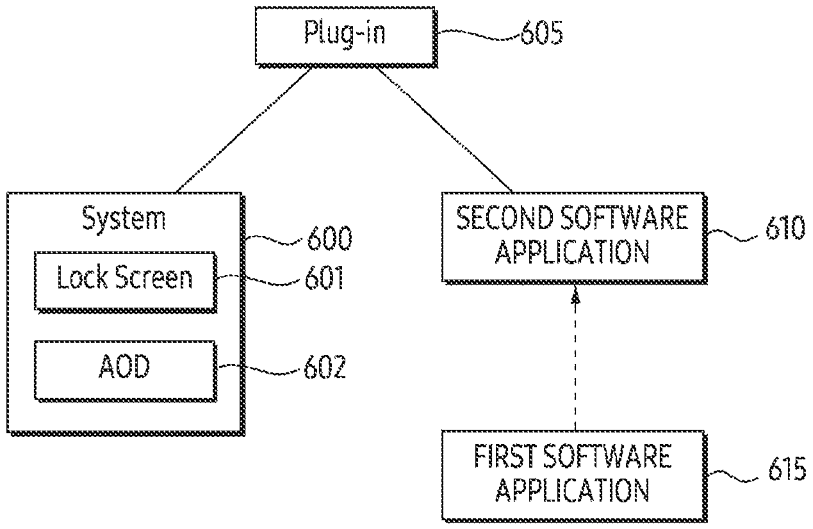
FIG. 6A is a diagram illustrating a relationship between components used to display a screen including a visual object in a low power state according to various embodiments.

FIG. 6A is a diagram illustrating a relationship between components used to display a screen including a visual object in a low power state according to various embodiments. The low power state may be referred to as the AOD mode.

The components illustrated in FIG. 6A may represent a relationship between software applications for displaying the AOD screen including the visual object in the electronic device 101 of FIG. 3 in the low power state. Accordingly, the components of FIG. 6A may represent programs installed in the electronic device 101.

Referring to FIG. 6A, the electronic device 101 may include a software application 600 (hereinafter, referred to as a system 600) that provides a user interface for a system, a first software application 615, and a second software application 610. The electronic device 101 may process an image including the visual object obtained from the first software application 615 through the second software application 610. The first software application 615 may represent a software application provided by a third party, such as a software application that provides weather information. The second software application 610 may represent a software application for setting a lock screen 601 and an AOD screen 602. An example of the processing of the image by the second software application 610 is described in greater detail below with reference to FIG. 6B.

The electronic device 101 may include a plug-in 605 to apply data processed by the second software application 610 to the lock screen 601 and the AOD screen 602. For example, the plug-in 605 may represent a configuration for controlling the data obtained from the second software application 610 to be shared with the system 600. For example, the plug-in 605 may not share the data with the system 600 in case that the data provided by the second software application 610 is difficult to display through the AOD screen 602, based on a limitation (e.g., memory) of the system 600. In other words, the plug-in 605 may control the data exceeding a reference size not to be displayed on a screen (e.g., the lock screen 601 or the AOD screen 602) of the system 600.

Figure 6B:
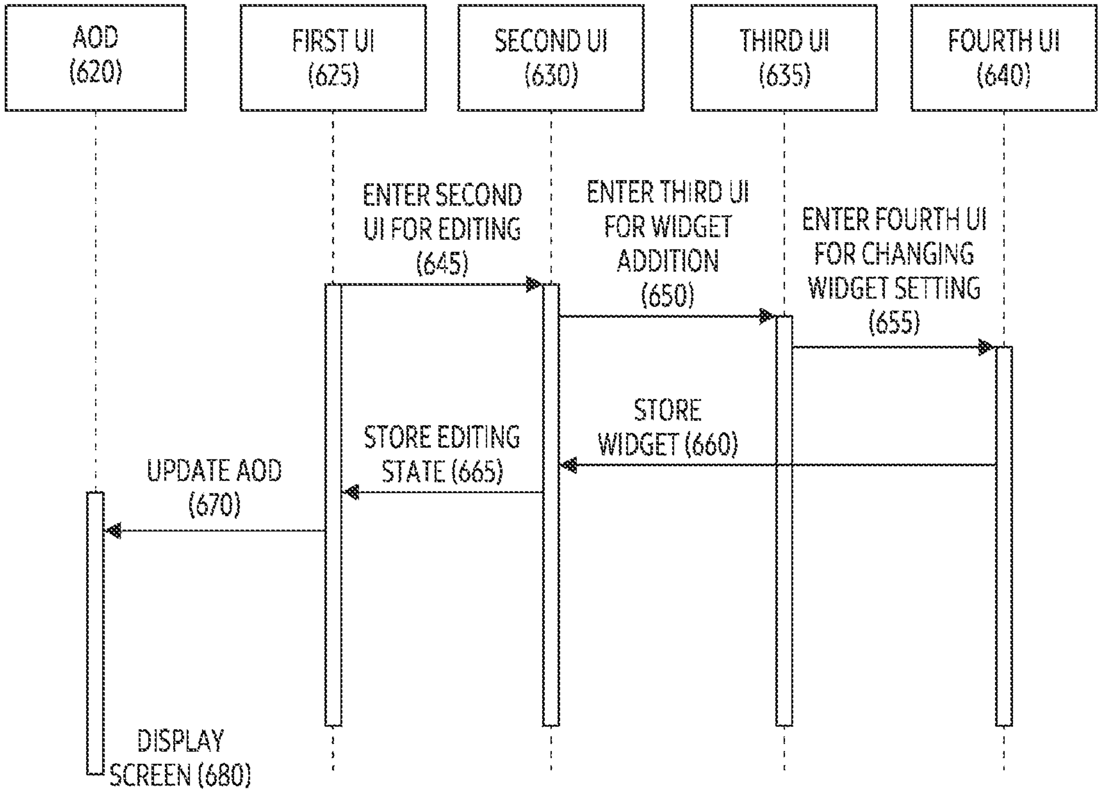
FIG. 6B is a signal flow diagram illustrating an example method of setting a visual object to be displayed through a software application for displaying a visual object in a low power state according to various embodiments.

FIG. 6B is a signal flow diagram illustrating an example operation of setting a visual object to be displayed through a software application for displaying a visual object in a low power state according to various embodiments.

The low power state may be referred to as an AOD mode. The software application for displaying the visual object in the low power state may represent a second software application. For example, the second software application may set a screen for the low power state. The screen for the low power state may be referred to as an AOD screen. The setting may include adding, deleting, or editing a visual object (e.g., a widget) related to another software application to be displayed on the screen.

An AOD 620 of FIG. 6B may represent a user interface (UI) of the AOD screen. A first UI 625, a second UI 630, a third UI 635, and a fourth UI 640 may represent user interfaces of the second software application. For example, the first UI 625 may represent a main screen of the second software application. For example, the first UI 625 may include a preview for the AOD screen and a lock screen, which are setting objects. For example, the second UI 630 may be accessible based on at least one user input for the first UI 625, and may represent a user interface for editing the AOD screen or the lock screen. For example, the third UI 635 may represent a user interface including a visual object (e.g., the widget) to be displayed on the AOD screen or the lock screen. For example, the third UI 635 may be displayed in a state superimposed on at least some areas for the second UI 630. For example, the third UI 635 may be set to be able to be sliding. In response to the sliding, the third UI 635 may display a plurality of visual objects. The fourth UI 640 may represent a user interface for adjusting an attribute for at least one visual object added based on the third UI 635. For example, the attribute may include a color temperature (or color, color sense) and a transparency for the at least one visual object.

Although not illustrated in FIG. 6B, the second software application may obtain information on a visual object (e.g., the widget) that may be displayed through the AOD screen or the lock screen from a software application (e.g., a first software application) provided by a third party. For example, the information on the visual object may include a minimum size of the visual object and image information representing the visual object.

Referring to FIG. 6B, the electronic device 101 may display the first UI 625 in response to execution of the second software application. In operation 645, the electronic device 101 may display the second UI 630 for editing the AOD screen or the lock screen in response to the at least one user input for the first UI 625. For example, the electronic device 101 may enter the second UI 630 in response to the at least one user input for the first UI 625 of the second software application. For example, the electronic device 101 may display the second UI 630.

In operation 650, the electronic device 101 may enter the third UI 635 for widget addition in response to at least one user input for the second UI 630. For example, the electronic device 101 may display the third UI 635 that is at least partially superimposed on the second UI 630, in response to at least one user input for an area of the second UI 630. For example, in case that there is no item displayed on the second UI 630, the area may represent an area corresponding to a visual object representing widget addition displayed on the second UI 630. For example, the item may represent visual information displayed on the second software application corresponding to the visual object (e.g., the widget) to be displayed on the AOD screen. The item displayed on the second UI 630 may include an item representing a widget that has already been added. The visual object representing the widget addition may include text (e.g., "Can contain a widget."). In case that the item displayed on the second UI 630 exists, the area may include an icon (e.g., an icon 719 of a second UI 712 of FIG. 7A below) disposed in an area where the item displayed on the second UI 630 is located.

In operation 655, the electronic device 101 may enter the fourth UI 640 for changing widget setting in response to the at least one user input for the second UI 630. For example, the electronic device 101 may display a preview for an item representing added widget through the second UI 630, based on at least one input for the third UI 635. The electronic device 101 may display the fourth UI 640 in response to the at least one input for the preview. Although not illustrated in FIG. 6B, the electronic device 101 may change an attribute for the item representing the added widget based on at least one user input for the fourth UI 640.

In operation 660, the electronic device 101 may store the item having the changed attribute. According to storage of the item, the electronic device 101 may display the second UI 630. The second UI 630 displayed according to the storage may include the item having the changed attribute. In operation 665, the electronic device 101 may store an editing state. As the editing state is stored, the electronic device 101 may display the first UI 625. The first UI 625 may include the AOD screen or the lock screen representing the stored editing state.

Although not illustrated in FIG. 6B, the electronic device 101 may identify an OPR for a visual object corresponding to the item. For example, the electronic device 101 may identify the OPR for the visual object using the second software application. For example, in case that the visual object is newly added, the electronic device 101 may identify the OPR for the visual object. However, the present disclosure is not limited thereto. For example, in relation to a previously added visual object, in case that an event is identified using a software application related to the previously added visual object, an OPR for the previously added visual object may be identified.

For example, in case that the identified OPR exceeds a reference OPR, the electronic device 101 may identify a changed OPR based on a transparency from the identified OPR.

In operation 670, the electronic device 101 may update information on the visual object having the changed OPR to the AOD 620. In operation 680, based on the information on the visual object, the electronic device 101 may display a screen (the AOD screen, or the screen for the low power state) including the visual object having the changed OPR, through a display panel 340.

Referring to FIGS. 6A and 6B, the electronic device 101 may add and display the visual object representing the widget using the second software application. Examples of operations of adding the visual object, editing the added visual object, and displaying the edited visual object using the second software application are described in greater detail below with reference to FIGS. 7A to 11.

Figure 7A:
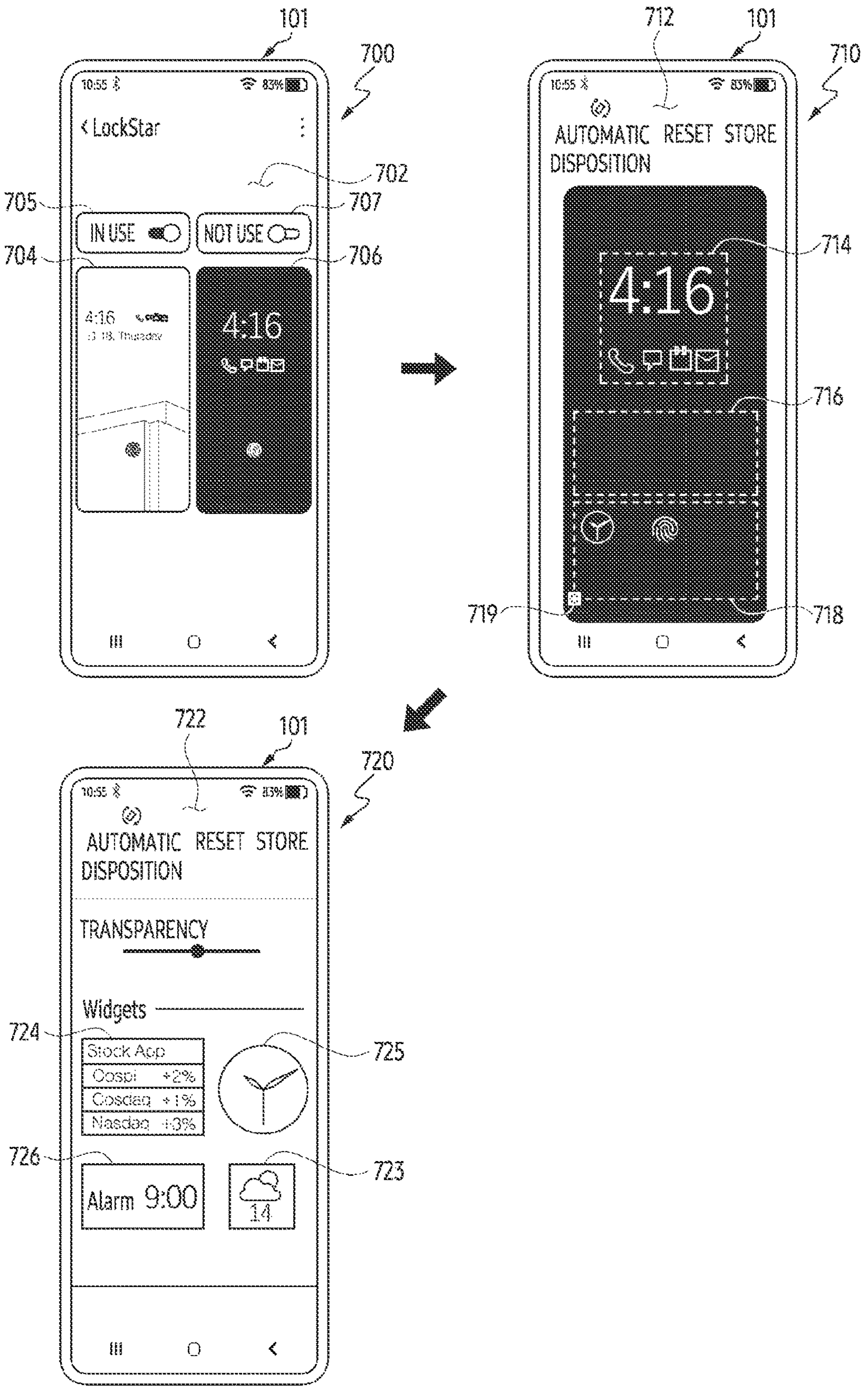
FIGS. 7A and 7B are diagrams illustrating examples of a user interface for setting a visual object to be displayed in a low power state according to various embodiments.
Figure 7B:
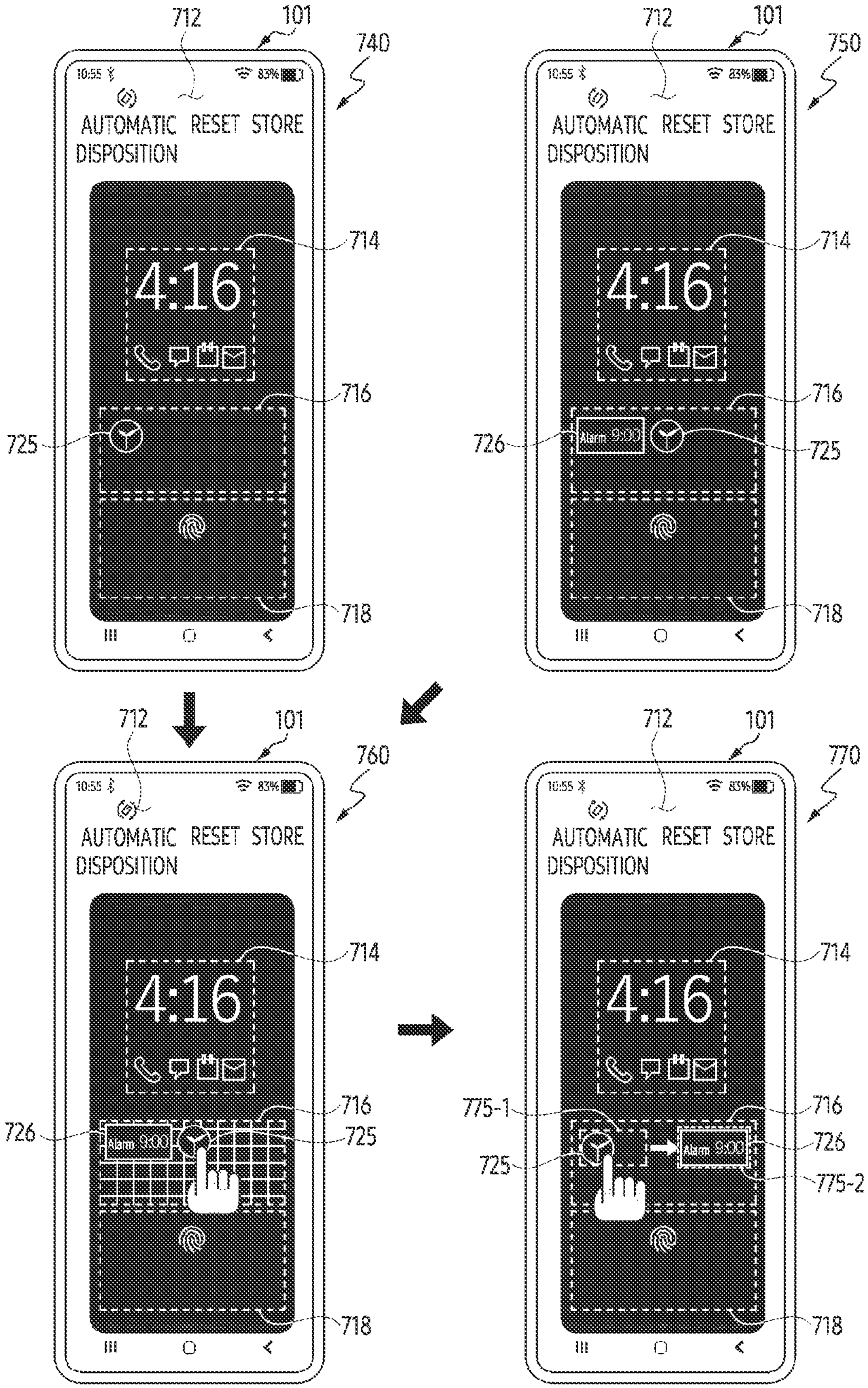

FIGS. 7A and 7B are diagrams illustrating examples of a user interface for setting a visual object to be displayed in a low power state according to various embodiments.

The low power state may be referred to as the AOD mode. The user interface may include a user interface of a second software application. For example, the user interface may include at least one of a first UI 625, a second UI 630, a third UI 635, or a fourth UI 640 of FIG. 6B.

Examples 700, 710, and 720 of FIG. 7A may represent examples of an operation of adding the visual object (e.g., a widget). Examples 740, 750, 760, and 770 of FIG. 7B may represent examples of an operation of disposing the visual object (e.g., the widget).

Referring to the example 700, the electronic device 101 may display a first UI 702 in response to execution of the second software application. The first UI 702 may include a preview for an AOD screen and a lock screen that are setting targets. For example, the first UI 702 may include a preview 704 for the lock screen and a preview 706 for the AOD screen. The first UI 702 may include an icon 705 representing whether a setting is applied (or used) for the lock screen and an icon 707 representing whether a setting is applied (or used) for the AOD screen. However, the present disclosure is not limited thereto. For example, the first UI 702 may further include at least one visual object for setting.

Referring to the examples 700 and 710, the electronic device 101 may display the second UI 712 for editing the AOD screen based on at least one user input for the first UI 702. For example, the electronic device 101 may display the second UI 712 of the example 710 based on the at least one user input for the preview 706.

Referring to the example 710, the second UI 712 may include a plurality of areas representing the positions of visual objects (e.g., widgets) that may be displayed in the AOD screen. For example, the plurality of areas may be disposed at different positions. For example, the plurality of areas may be formed in different sizes. However, the present disclosure is not limited thereto, and the plurality of areas may have the same size. Referring to the example 710, an area 714 of the plurality of areas may include an item representing time. The item representing the time may represent a widget that is being displayed on the AOD screen. For example, the item may represent visual information corresponding to a visual object that is displayed or to be displayed through the AOD screen.

Referring to the examples 710 and 720, in case that an area 716 of the second UI 712 does not include an item, a third UI 722 for adding at least one item to be added to the area 716 may be displayed in response to at least one user input for the area 716. For example, the third UI 722 may be displayed in a state that is at least partially superimposed on the second UI 712. For example, the third UI 722 may be displayed by sliding in a direction from a bottom to a top of the display panel 340 of the electronic device 101. However, the present disclosure is not limited thereto. In addition, in case that the plurality of areas of the second UI 712 do not include the item, the third UI 722 for adding the at least one item to be added may be displayed after the second UI 712 is displayed.

Referring to the example 720, the third UI 722 may include a plurality of items. For example, the plurality of items may include an item 723 related to a software application to provide weather information, an item 724 related to a software application to provide stock information, an item 725 related to a software application to provide an analog watch, and an item 726 related to a software application to provide an alarm function. However, the present disclosure is not limited thereto. For example, the plurality of items included in the third UI 722 may be related to widgets of a software application (e.g., a first software application) that may be displayed through a home screen of the electronic device 101. For example, the plurality of items may represent a preview of widgets of a software application that may be added to the home screen. As described above, the electronic device 101 may display the widget of the software application that may be displayed through the home screen through the AOD screen by adding the at least one item through the third UI 722.

Referring to the examples 710 and 720, in case that an area 718 of the second UI 712 includes at least one item, in response to at least one user input for the icon 719 located at a point of a boundary representing the area 718, the third UI 722 for adding at least one item to be added to the area 718 may be displayed.

Referring to the example 720, based on a user input for at least one item among the plurality of items included in the third UI 722, the at least one item may be added to the second UI 712. Referring to the example 740, based on a user input for one item 725 among the plurality of items included in the third UI 722, the second UI 712 may include the item 725 in the area 716. Referring to the example 750, based on a user input for two items 725 and 726 among the plurality of items included in the third UI 722, the second UI 712 may include items 725 and 726 in the area 716.

For convenience of description, the examples 760 and 770 assume an operation of disposing the item 725 for the example 750 in which two items 725 and 726 are added.

Referring to the example 760, the items 725 and 726 may be disposed at an arbitrary position in the area 716. For example, based on a user input for the item 725, a position of the item 725 may be changed in the area 716. The user input may include a drag input. For example, a size of the item 725 may be variable. The size of the item 725 may be formed to have a size greater than or equal to a minimum size. For example, the minimum size may be set from a software application for providing the analog watch that provides the item 725.

Referring to the example 770, the item 725 may be moved to a position 775-1 of the item 726 according to the drag input. In this case, according to a movement of the item 725, the item 725 may be moved from the position 775-1 to a position 775-2. In other words, according to the movement of the item 725, a position of the existing item 726 may be rearranged.

Referring to the above, the electronic device 101 may add a visual object displayed on the AOD screen and may change a position of the visual object using the second software application. For example, the electronic device 101 may change the addition, deletion, or disposition of the visual object by adding, deleting, or disposing an item corresponding to the visual object on the user interface using a user interface of the second software application.

Figure 8:
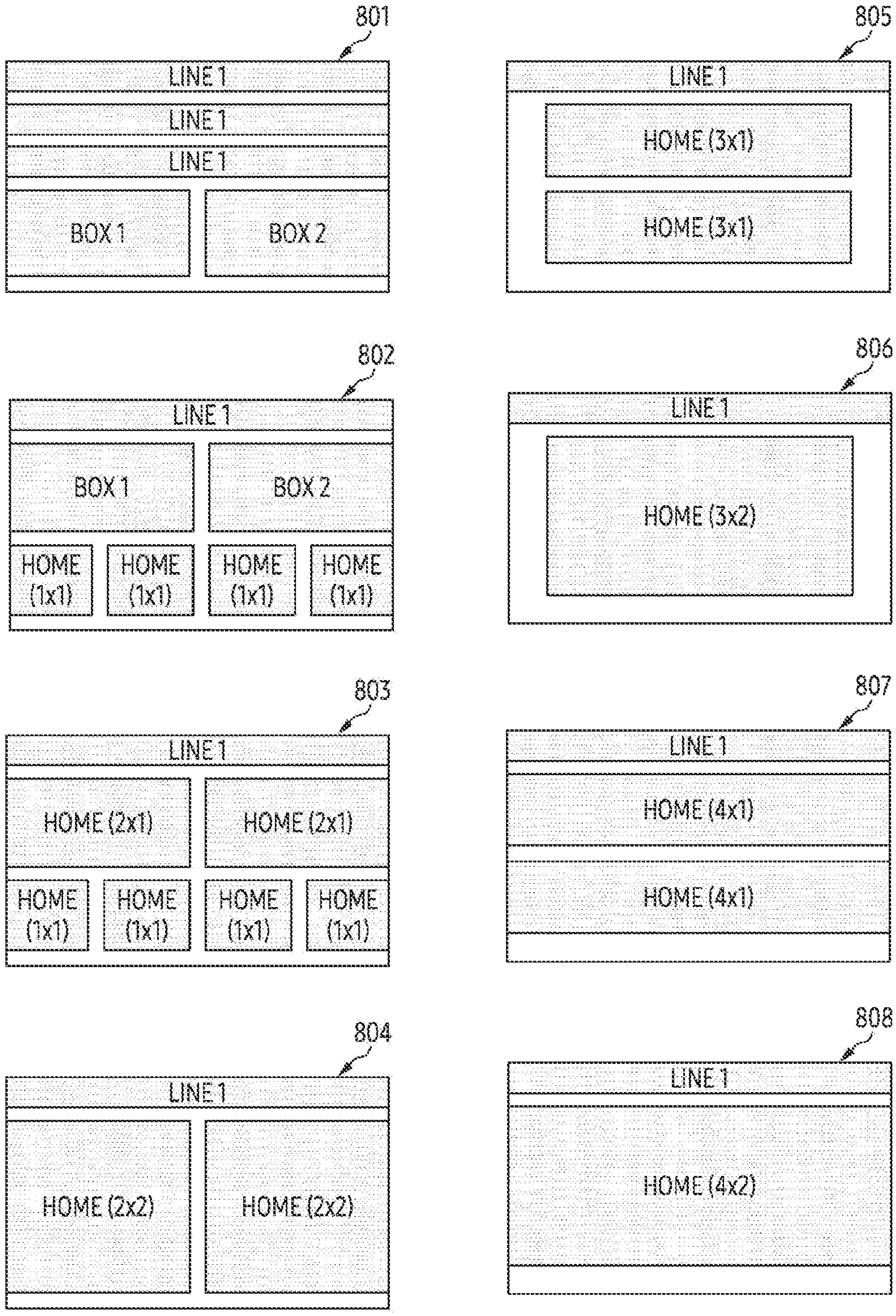
FIG. 8 is a diagram illustrating an example layout of a visual object displayed on a screen according to various embodiments.

FIG. 8 is a diagram illustrating an example of a layout of a visual object displayed on a screen according to various embodiments.

Examples 801, 802, 803, 804, 805, 806, 807, and 808 of FIG. 8 illustrate examples of a layout of the visual object. In examples 801, 802, 803, 804, 805, 806, 807, and 808, the visual object may be referred to as a widget. A type of the widget may include a box widget, a line widget, and a home widget. For example, the box widget and the line widget may include a widget for which customizing has been completed. For example, the box widget and the line widget may represent a widget that may be displayed in an optimized state based on burn-in/afterimage or power consumption when displayed on a screen (e.g., an AOD screen) for a low power state. The box widget and the line widget may represent a widget related to a software application provided by a manufacturer (e.g., a $1^{st}$ party) of an electronic device 101 or a telecommunication company (e.g., a $2^{nd}$ party) that provides a communication service of the electronic device 101 that are not a third party. On the other hand, the home widget may include a widget that is not customized, unlike the box widget and the line widget. For example, the home widget may represent a widget related to a software application provided by the third party.

Referring to the example 801, the electronic device 101 may display the AOD screen including three line widgets and two box widgets. Referring to the example 802, the electronic device 101 may display the AOD screen including one line widget, two box widgets, and four home widgets. Each of the four home widgets of the example 802 may be formed to have a size of 1×1. Referring to the example 803, the electronic device 101 may display the AOD screen including one line widget, two home widgets having a size of 2×1, and four home widgets having the size of 1×1. Referring to the example 804, the electronic device 101 may display the AOD screen including one line widget and two home widgets having a size of 2×2. Referring to the example 805, the electronic device 101 may display the AOD screen including one line widget and two home widgets having a size of 3×1. Referring to the example 806, the electronic device 101 may display the AOD screen including one line widget and one home widget having a size of 3×2. Referring to the example 807, the electronic device 101 may display the AOD screen including one line widget and two home widgets having a size of 4×1. Referring to the example 808, the electronic device 101 may display the AOD screen including one line widget and one home widget having a size of 4×2. However, the present disclosure is not limited thereto. For example, the AOD screen may include at least one of the box widget, the line widget, or the home widget.

Referring to the above, the electronic device 101 may display the AOD screen including at least one visual object based on a freely deployable layout. In this case, the line widget or the box widget may not have problems of burn-in/afterimage or power consumption even if it is displayed through the AOD screen. However, the home widget is a widget based on the software application provided by the third party, and problems of burn-in/afterimage or power consumption may occur. Accordingly, according to an embodiment of the present disclosure, in case that the identified OPR of the home widget exceeds the reference OPR, the home widget may adjust and display the identified OPR to be less than the reference OPR based on a transparency. In case that the home widget is added to the AOD screen through the second software application, the electronic device 101 may display information notifying that visibility may be reduced as the OPR is adjusted through a user interface of the second software application. For example, the electronic device 101 may display a preview in which the home widget having the adjusted OPR is displayed on the AOD screen through the user interface of the second software application. In case that the home widget has a size that is limited to display through the AOD screen, the electronic device 101 may not display the home widget. For example, the electronic device 101 may display information notifying that the home widget cannot be displayed exceeding the limited size through the user interface of the second software application.

Figure 9:
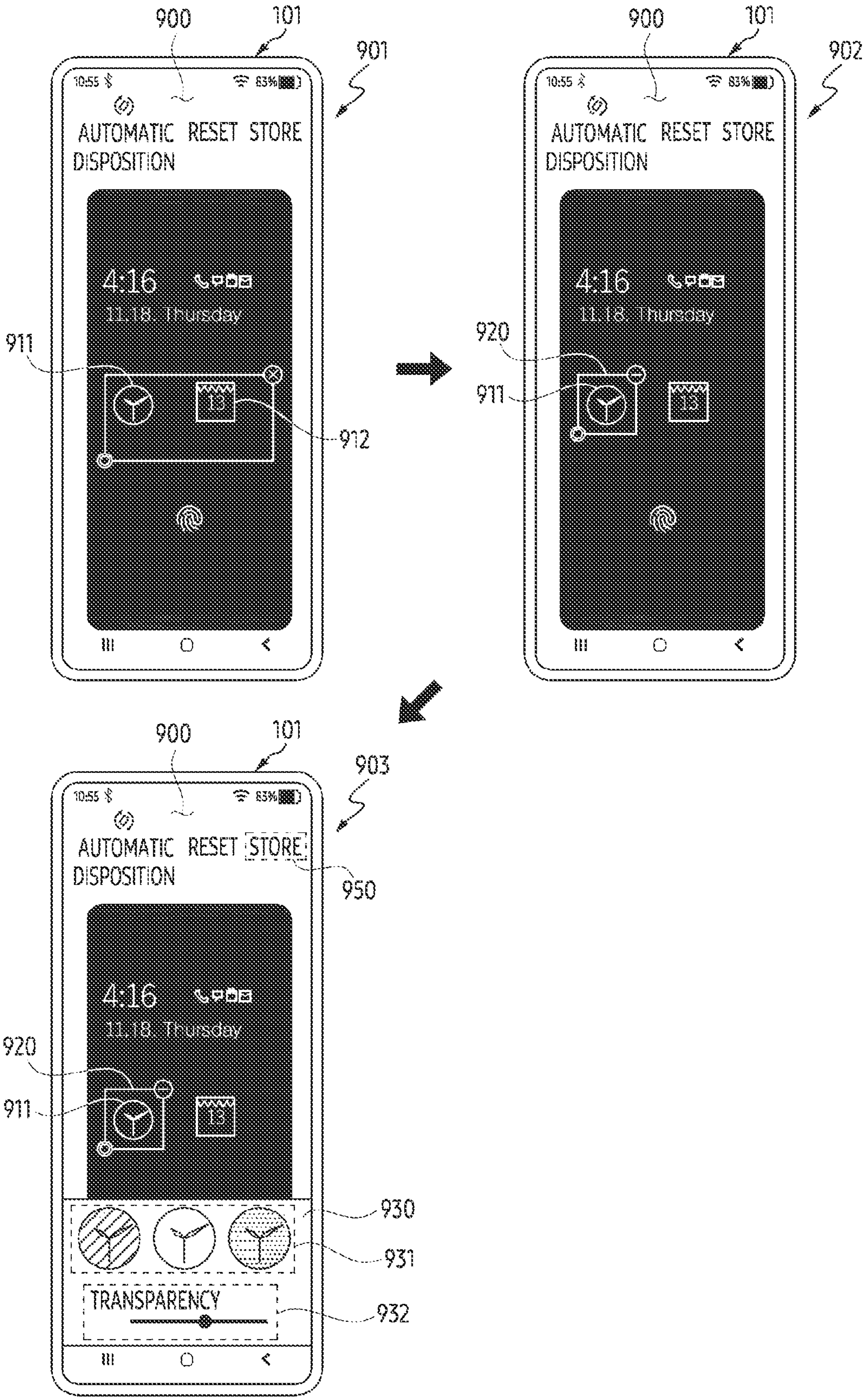
FIG. 9 is a diagram illustrating an example operation of changing an attribute of a visual object to be displayed in a low power state according to various embodiments.

FIG. 9 is a diagram illustrating an example operation of changing an attribute of a visual object to be displayed in a low power state according to various embodiments.

The low power state may be referred to as the AOD mode. The attribute may include a color temperature (or color, color sense) and a transparency for the visual object. However, the present disclosure is not limited thereto.

Examples 901, 902, and 903 of FIG. 9 illustrate an example in which the electronic device 101 changes the attribute of the visual object to be displayed on a screen (e.g., an AOD screen) for the low power state using the second software application.

Referring to the example 901, the electronic device 101 may display a second UI 900 of the second software application, which is a user interface for editing the AOD screen or a lock screen. The second UI 900 may include added items 911 and 912 in response to a user input for a third UI (not illustrated). For example, the item 911 may represent a widget that displays an analog clock. For example, the item 912 may represent a widget that provides a calendar.

Referring to the example 902, the electronic device 101 may identify a user input for one of the items 911 and 912 of the second UI 900. For example, the user input may include a touch input for the item 911. In response to the touch input, the electronic device 101 may display the second UI 900 including an indicator 920 displaying that the item 911 has been selected.

Referring to the example 903, the electronic device 101 may display a fourth UI 930 for changing an attribute for the item 911. For example, after displaying the indicator 920, the electronic device 101 may display the fourth UI 930 for the item 911 in a state superimposed on the second UI 900. For example, the fourth UI 930 may be displayed by sliding in a direction from a bottom to a top of a display panel 340 of the electronic device 101. For example, the fourth UI 930 may include a portion 931 for adjusting a color temperature of the item 911 and a portion 932 for adjusting a transparency of the item 911. However, the present disclosure is not limited thereto. For example, the fourth UI 930 may include another portion for adjusting an attribute of the item 911.

Referring to the example 903, the electronic device 101 may store an attribute for the adjusted item using the second software application. For example, in response to an input for an icon 950 for storing a current state included in the second UI 900 of the second software application, the attribute for the adjusted item may be stored.

Referring to the above, the electronic device 101 may change and store an attribute for the item using the second software application. Accordingly, the electronic device 101 may display the screen (e.g., the AOD screen) for the low power state including a visual object corresponding to the changed item.

Figure 10:
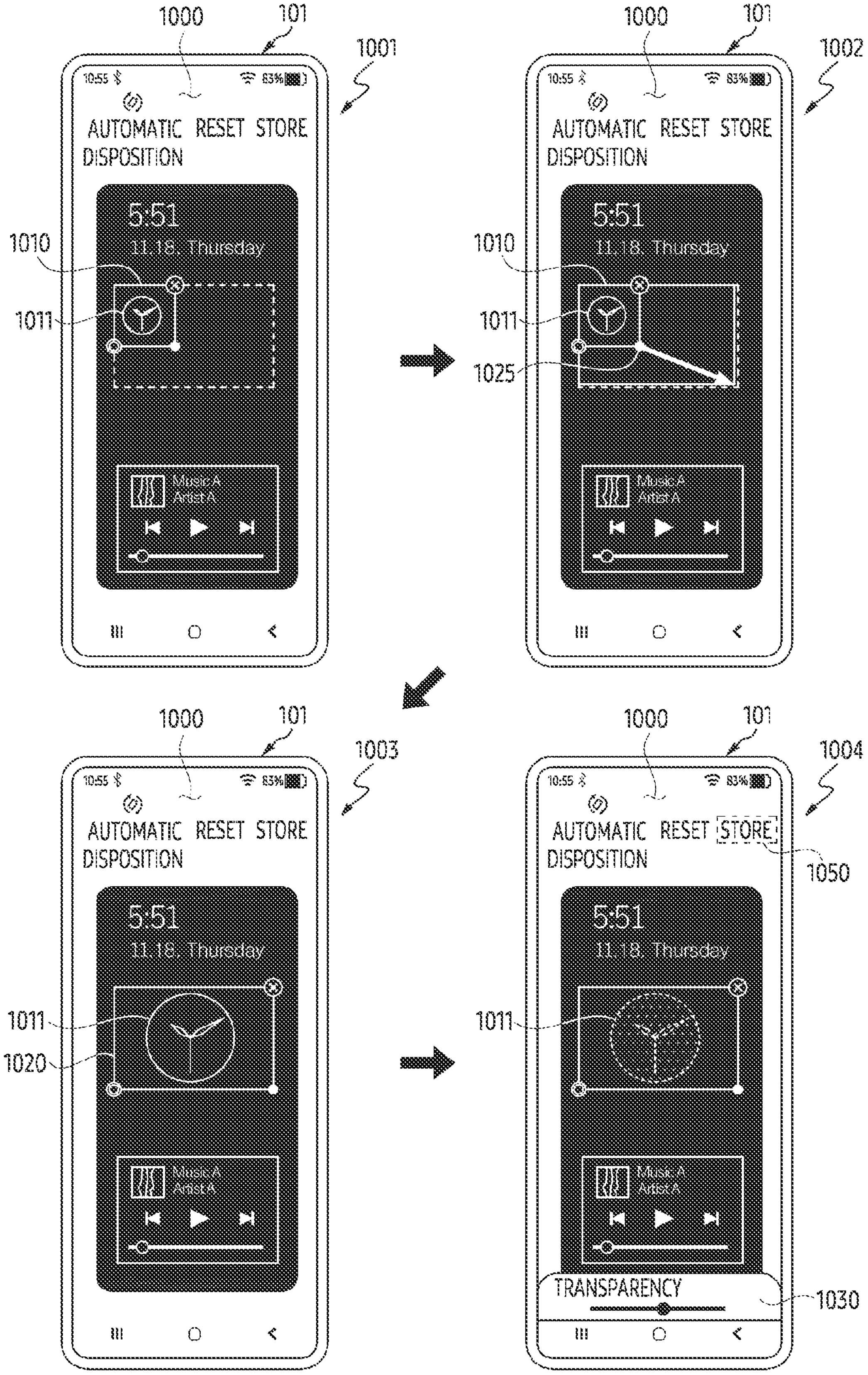
FIG. 10 is a diagram illustrating an example operation of changing the size of a visual object to be displayed in a low power state according to various embodiments.

FIG. 10 is a diagram illustrating an example operation of changing the size of a visual object to be displayed in a low power state according to various embodiments. The low power state may be referred to as the AOD mode.

Examples 1001, 1002, 1003, and 1004 of FIG. 10 illustrate an example in which an electronic device 101 changes the size of the visual object to be displayed on a screen (e.g., an AOD screen) for the low power state using the second software application.

Referring to the example 1001, the electronic device 101 may display a second UI 1000 of the second software application, which is a user interface for editing the AOD screen or a lock screen. The second UI 1000 may include an added item 1011 in response to a user input for a third UI (not illustrated). For example, the item 1011 may represent a widget that displays an analog clock. For example, the electronic device 101 may identify a user input for the item 1011 of the second UI 1000. For example, the user input may include a touch input for the item 1011. In response to the touch input, the electronic device 101 may display the second UI 1000 including an indicator 1010 representing that the item 1011 has been selected. The indicator 1010 may represent a current size of the item 1011.

Referring to the example 1002, the electronic device 101 may identify a user input for an icon 1025 located at a point of the indicator 1010 of the item 1011. For example, the user input may include a drag input. The electronic device 101 may change the size of the item 1011 based on the drag input for the icon 1025. For example, the electronic device 101 may enlarge the size of the item 1011 based on the drag input facing a direction expanding with respect to the icon 1025. Accordingly, referring to the example 1003, the indicator 1010 may be changed to an indicator 1020 for displaying the size of the enlarged item 1011.

Referring to the example 1004, as described in FIG. 9, an attribute for the item 1011 may be changed. For example, the electronic device 101 may display a fourth UI 1030 for changing the attribute for the item 1011. For example, after displaying the indicator 1020, the electronic device 101 may display the fourth UI 1030 for the item 1011 in a state superimposed on the second UI 1000. For example, the fourth UI 1030 may be displayed by sliding in a direction from a bottom to a top of a display panel 340 of the electronic device 101. For example, the fourth UI 1030 may include a portion for adjusting a transparency of the item 1011. However, the present disclosure is not limited thereto. For example, the fourth UI 1030 may include another portion for adjusting an attribute of the item 1011.

For example, in response to a user input for the portion, the transparency of the item 1011 may be adjusted. The item 1011 of the example 1004 may be displayed more transparently than the item 1011 of the example 1003 in response to the user input for the portion.

Referring to the example 1004, the electronic device 101 may store an attribute for the adjusted item using the second software application. For example, in response to an input for an icon 1050 for storing a current state included in the second UI 1000 of the second software application, the attribute for the adjusted item may be stored.

Referring to the above, the electronic device 101 may change and store a size (or size and attribute) for the item using the second software application. Accordingly, the electronic device 101 may display the screen (e.g., the AOD screen) for the low power state including a visual object corresponding to the changed item.

Figure 11:
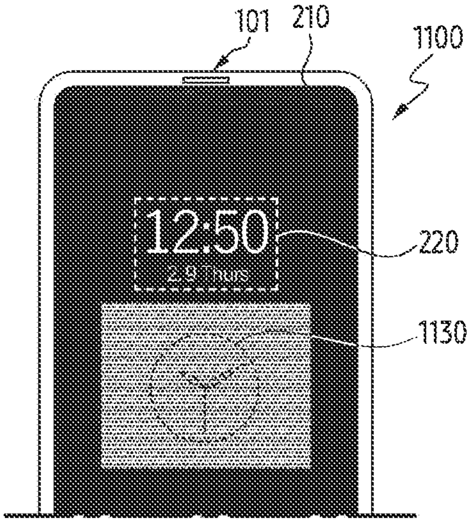
FIG. 11 is a diagram illustrating an example of displaying a screen including a visual object in a low power state according to various embodiments.

FIG. 11 is a diagram illustrating an example of displaying a screen including a visual object in a low power state according to various embodiments.

The low power state may be referred to as the AOD mode. The screen may represent a screen for the low power state. For example, the screen may be referred to as an AOD screen.

An example 1100 of FIG. 11 illustrates an example in which an electronic device 101 displays a visual object 1130 set through the second software application. For example, the electronic device 101 may display an AOD screen 210 including a visual object 220 representing a clock and the visual object 1130 displaying an analog clock through a display panel 340. For example, the visual object 1130 may represent a visual object corresponding to an item 1011 stored based on the second software application in an example 1004 of FIG. 10.

In the example 1100 of FIG. 11, the AOD screen 210 including the visual object 1130 corresponding to the item 1011 stored in the example 1004 of FIG. 10 is illustrated, but the present disclosure is not limited thereto. The AOD screen 210 may further include another visual object.

Figure 12:
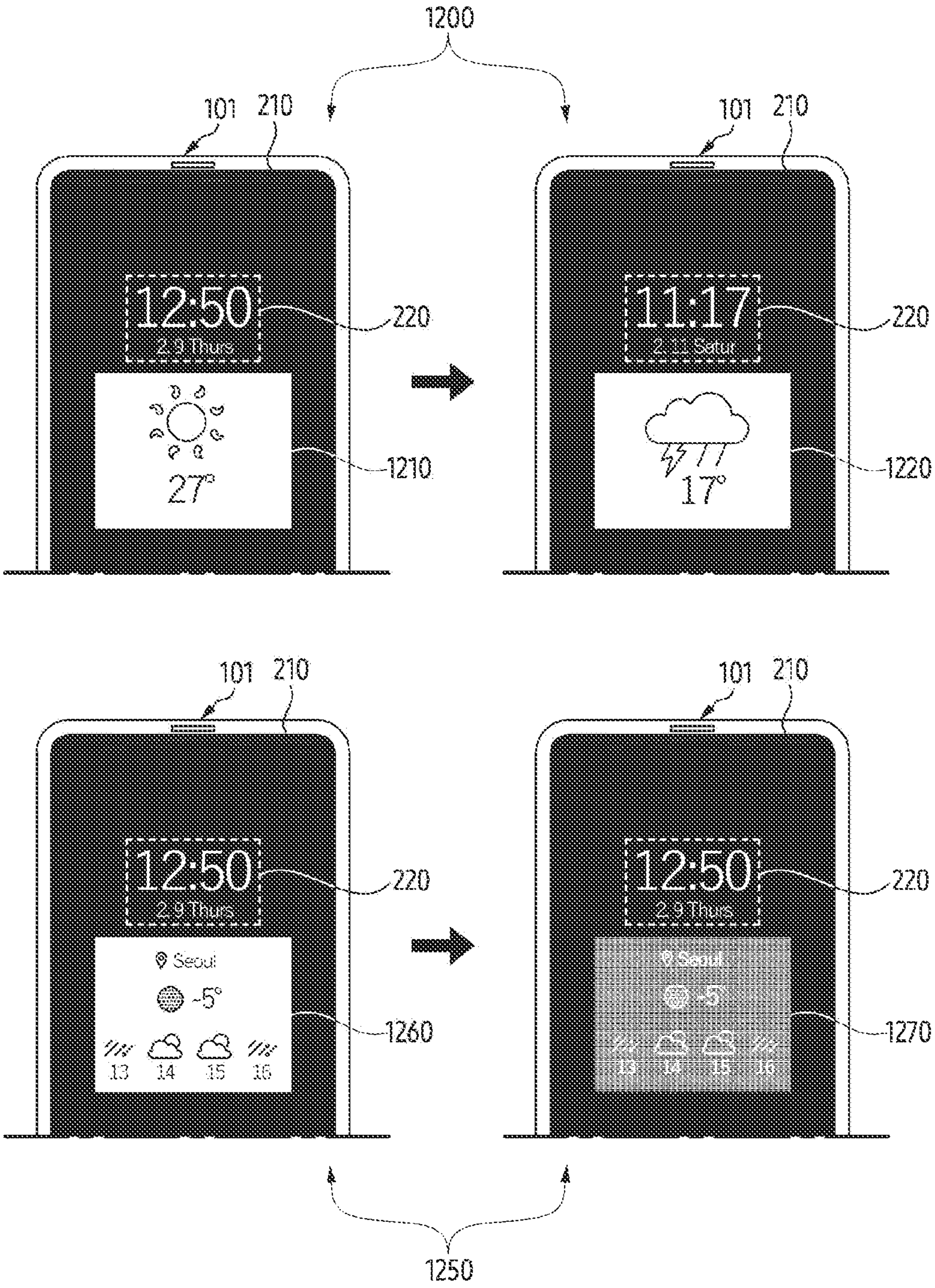
FIG. 12 is a diagram illustrating examples of an event for displaying a visual object in a low power state according to various embodiments.

FIG. 12 is a diagram illustrating examples of an event for displaying a visual object in a low power state according to various embodiments.

Examples 1200 and 1250 of FIG. 12 illustrate an example representing the event for displaying the visual object in the low power state. For example, the event may include at least one of a display (or addition) of the visual object, activation of an AOD function, a designated interval, a change (or update) of at least a portion of the visual object, or an event that changes a theme of the screen. An event for displaying (or adding) the visual object, and an event for changing (or updating) at least a portion of the visual object may be identified using the first software application. The screen on which the theme is changed may include screens that the electronic device 101 may display. For example, the displayable screens may include a screen 210 for the low power state. For example, the screen 210 for the low power state may be referred to as an AOD screen. The example 1200 may represent a case in which an event that changes at least a portion of the visual object is identified. The example 1250 may represent a case in which an event that changes a theme of the AOD screen is identified.

Referring to the example 1200, the electronic device 101 may display the screen 210 including a visual object 1210 representing weather information and a visual object 220 representing time. The visual object 1210 representing the weather information may be related to the first software application that provides the weather information. For example, the electronic device 101 may identify that the weather information has changed using the first software application. The electronic device 101 may identify the event that changes the visual object 1210 using the first software application in response to the weather information being changed. For example, the electronic device 101 may display the screen 210 including a visual object 1220 that has changed from the visual object 1210 and the visual object 220 representing the time, based on the event.

Referring to the example 1250, the electronic device 101 may display the screen 210 including a visual object 1260 representing the weather information and the visual object 220 representing the time. The visual object 1260 representing the weather information may be related to the first software application that provides the weather information. When comparing the examples 1200 and 1250, the visual object 1260 representing the weather information may be different from the visual object 1210, even though the same first software application providing the weather information is used. For example, the electronic device 101 may identify that the theme for the screens that the electronic device 101 may display is changed. For example, the theme may be changed based on at least one user input for the electronic device 101. The electronic device 101 may identify the event in response to the theme being changed. For example, the electronic device 101 may display the screen 210 including a visual object 1270 that has changed from the visual object 1260 and the visual object 220 representing the time, based on the event. For example, the visual object 1270 may represent a visual object to which a dark theme has been applied for the visual object 1260. For example, the dark theme may represent a theme in which a background of the visual object is inverted (e.g., from white to black).

FIG. 12 illustrates examples 1200 and 1250 of a case in which a visual object to be displayed is changed as the weather is changed and a case in which the theme of the screen is changed, as examples of the event, but the present disclosure is not limited thereto. For example, in case that the first software application is a software application for playing music, the visual object displayed on the screen 210 may display information on music being played. In case that the music being played is changed, the visual object may be changed.

For example, the electronic device 101 may identify an OPR of the visual object in response to identifying the event. For example, the electronic device 101 may identify the OPR of each of all visual objects included in the screen 210 in response to some event. For example, some event may include the electronic device 101 adding a new visual object through the second software application. In addition, some event may include electronic device 101 changing the AOD function from an off state to an on state. In addition, some event may include changing a theme of screens that the electronic device 101 may display. In addition, some event may include a designated interval (e.g., 1 minute). For example, the electronic device 101 may identify the OPR at the same timing according to the designated interval for all visual objects displayed on the screen 210. Identifying the OPR of each of all the visual objects at the same timing may reduce power consumption of the electronic device 101 compared to identifying the OPR of each of all the visual objects at different timings. This is because the electronic device 101 needs to frequently identify the OPR of each of all the visual objects at different timings. By identifying the OPR at the same timing for all visual objects for each designated interval, the power consumption of the electronic device 101 operating in the low power state may be reduced.

For example, in response to identifying the some event, the electronic device 101 may identify the OPR for each of the visual objects included in the screen 210 and may compare the identified OPR with a reference OPR. Accordingly, the electronic device 101 may adjust the OPR using the second software application for a visual object having an OPR exceeding the reference OPR. Afterwards, the electronic device 101 may display the visual object having the adjusted OPR through the screen 210.

The electronic device 101 may identify an OPR of a specific visual object in the screen 210 in response to other some event. For example, the other some event may include executing an update (or refresh) function for the specific visual object. The update function may be executed in response to a user input for an icon included in an area related to the specific visual object. The related area may include an adjacent area of the specific visual object or an area superimposed on the specific visual object. In addition, some other event may include identifying a display of the visual object and a change (or update) of at least a portion of the visual object using the first software application. For example, the electronic device 101 may identify the OPR of the specific visual object and may compare the identified OPR with the reference OPR in response to identifying the other some event. Accordingly, the electronic device 101 may adjust the OPR using the second software application in case of the specific visual object having an OPR exceeding the reference OPR. The electronic device 101 may display the specific visual object having the adjusted OPR through the screen 210.

Figure 13:
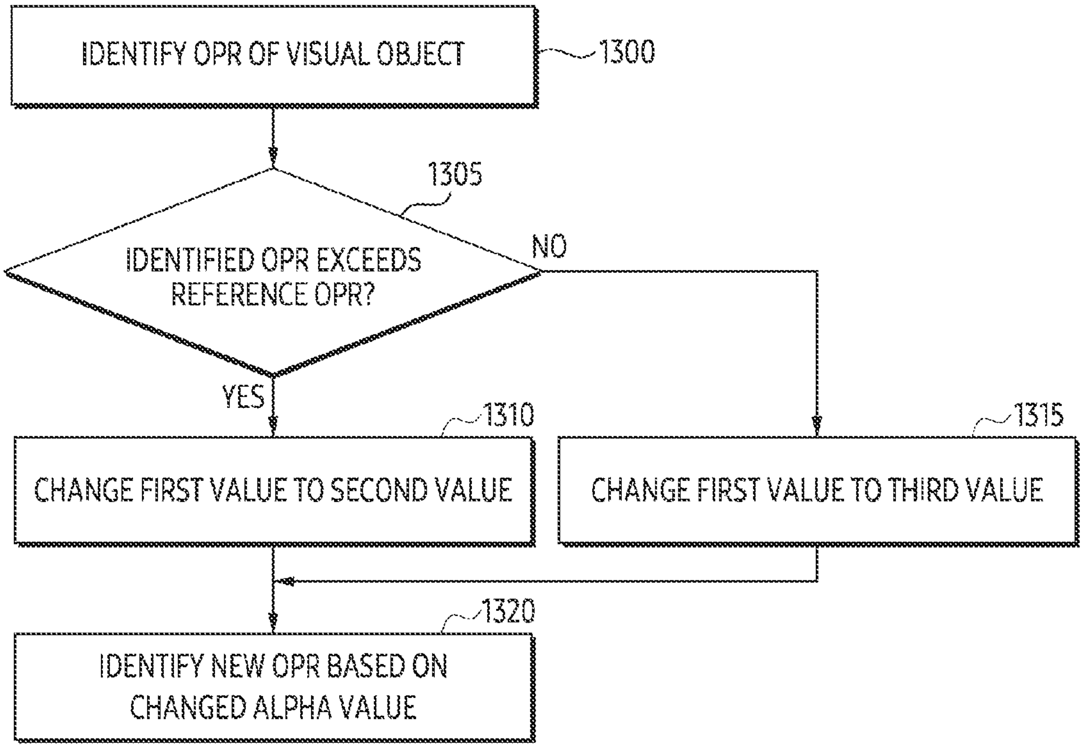
FIG. 13 is a flowchart illustrating an example method of changing a transparency based on an OPR of a visual object according to various embodiments.

FIG. 13 is a flowchart illustrating an example operation of changing a transparency based on an OPR of a visual object according to various embodiments.

The operations of FIG. 13 may be performed by an electronic device 101 of FIG. 3. For example, the operations of FIG. 13 may be performed by at least one processor included in the electronic device 101 of FIG. 3. For example, the at least one processor may include a processor 310 and a display driving circuit 320 of FIG. 3.

Although not illustrated in FIG. 13, the electronic device 101 may display a screen for a low power state. For example, while the electronic device 101 is in the low power state, the screen may be displayed through a display panel 340. The screen may be referred to as an AOD screen.

In operation 1300, the electronic device 101 may identify the OPR of the visual object. For example, while the AOD screen is displayed, the electronic device 101 may identify an event for displaying the visual object in the AOD screen using the second software application. For example, the event may include at least one of a display (or addition) of the visual object, activation of an AOD function, a designated interval, a change (or update) of at least a portion of the visual object, or an event that changes a theme of the screen. An event for displaying (or adding) the visual object, and an event for changing (or updating) at least a portion of the visual object may be identified using the first software application. The screen on which the theme is changed may include screens that the electronic device 101 may display. For example, the electronic device 101 may identify a value representing a transparency of the visual object. For example, the electronic device 101 may identify an alpha value of the visual object as a first value.

For example, the electronic device 101 may identify an OPR for each of all visual objects included in the AOD screen in response to some event. For example, in response to other some event, the electronic device 101 may identify an OPR for a visual object related to the other some event. For example, the OPR of the visual object may represent a ratio of at least some pixels to be used to display the visual object among a plurality of pixels (or subpixels) included in a display panel (e.g., the display panel 340 of FIG. 3). For example, the OPR of the visual object may represent a ratio of a sum of RGB values of each of the at least some pixels for a case that entire of the plurality of pixels display white (e.g., RGB value (or gradation, grayscale) is maximum). The OPR of the visual object may represent an OPR additionally sampled for the ratio. For example, in case that an OPR according to the ratio is 30%, the OPR sampled at 75% may be 22.5%. The sampling may represent scaling the number of the at least some pixels to be used to display the visual object.

For example, the electronic device 101 may identify the OPR of the visual object based on an image representing the visual object obtained from the first software application. In addition, the electronic device 101 may identify an OPR of each of a plurality of visual objects, based on an image obtained from a software application related to each of the plurality of visual objects, in case of identifying an OPR for the plurality of visual objects in the AOD screen.

Hereinafter, for convenience of explanation, it is assumed that the electronic device 101 has identified an OPR of one visual object in response to the event. For example, the electronic device 101 may identify the OPR of the visual object in response to the event. However, the present disclosure is not limited thereto, and the following operations may be individually performed for each of the plurality of visual objects.

In operation 1305, the electronic device 101 may identify whether the identified OPR exceeds a reference OPR. For example, the electronic device 101 may identify whether the identified OPR of the visual object exceeds the reference OPR using the second software application. For example, the reference OPR may be identified based on power used to display the AOD screen in the low power state. For example, the reference OPR may be set to at least one value between 10% and 15%. However, the present disclosure is not limited thereto.

In operation 1305, the electronic device 101 may perform operation 1310 in case that the identified OPR exceeds the reference OPR. On the other hand, the electronic device 101 may perform operation 1315 in case that the identified OPR is less than or equal to the reference OPR.

In operation 1310, the electronic device 101 may change the first value to a second value. For example, in response to the identified OPR greater than the reference OPR, the electronic device 101 may identify the second value that is changed from the first value representing the transparency of the visual object.

In operation 1315, the electronic device 101 may change the first value to a third value. For example, in response to the identified OPR less than or equal to the reference OPR, the electronic device 101 may identify the third value that is changed from the first value representing the transparency of the visual object. For example, the third value may be a value greater than the second value.

In operation 1320, the electronic device 101 may identify a new OPR based on the changed alpha value.

For example, the electronic device 101 may identify a new OPR of the visual object based on the second value. For example, the new OPR may represent a value scaled based on the second value for the OPR identified in operation 1300. For example, the new OPR may represent a value multiplied by a ratio between the first value and the second value with respect to the identified OPR. For example, assuming the identified OPR is 15%, the first value is 1.0, and the second value is 0.45, the new OPR may be 6.75%.

For example, the electronic device 101 may identify the new OPR of the visual object based on the third value. For example, the new OPR may represent a value scaled based on the third value for the OPR identified in operation 1300. For example, the new OPR may represent a value multiplied by a ratio between the first value and the third value with respect to the identified OPR. For example, assuming the identified OPR is 10%, the first value is 1.0, and the second value is 0.6, the new OPR may be 6%.

For example, in case that sampling is performed for the identified OPR as described above, the electronic device 101 may identify the new OPR based on the alpha value for the sampled OPR. For example, in case that the identified OPR is 28%, the sampled OPR may be 21%. For the sampled OPR, the new OPR adjusted using the changed alpha value (e.g., the second value is 0.45) may be 9.45%.

Although not illustrated in FIG. 13, the electronic device 101 may display the AOD screen including the visual object based on the new OPR identified using the second software application. The visual object (e.g., a visual object whose transparency is the second value or the third value) having the new OPR may look darker compared to the visual object (e.g., the visual object whose transparency is the first value) having an unchanged OPR.

Referring to the above, in case that the OPR identified for the visual object exceeds the reference OPR, the electronic device 101 may further adjust the transparency of the visual object. In addition, even in case that the OPR identified for the visual object is less than or equal to the reference OPR, the electronic device 101 may adjust the transparency of the visual object. Adjusting the transparency even in case that the identified OPR is less than or equal to the reference OPR is because a screen on which the visual object is displayed is the AOD screen for the low power state. Accordingly, the electronic device 101 may prevent and/or reduce burn-in and an afterimage and may reduce power consumption by dynamically adjusting the OPR in case of displaying the visual object (e.g., a widget) on the AOD screen.

Figure 14:
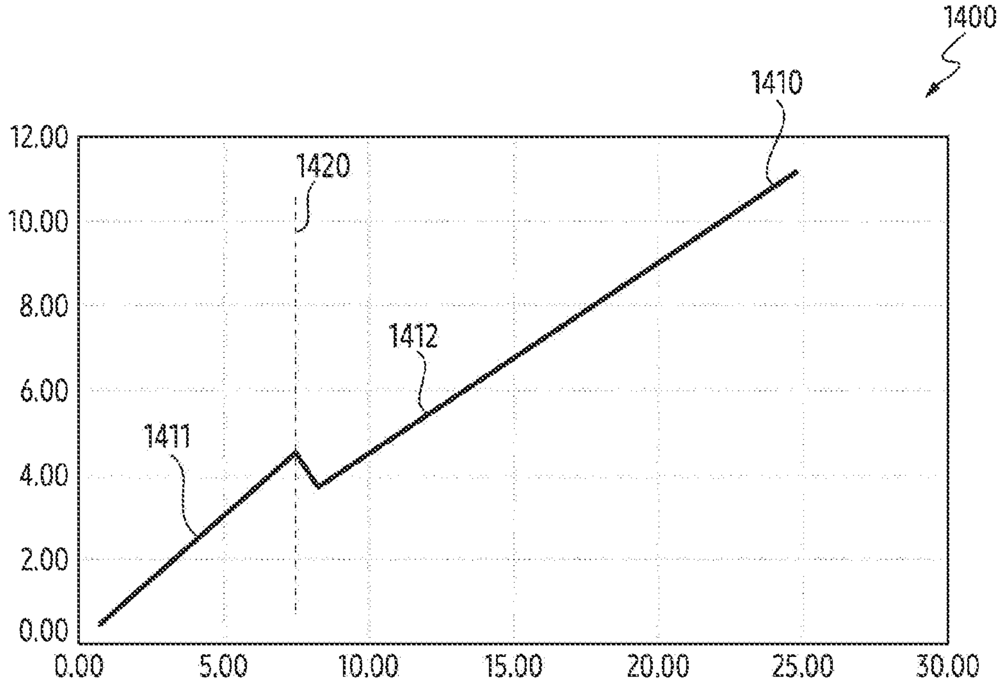
FIG. 14 is a graph illustrating an OPR changed based on a transparency according to various embodiments.

FIG. 14 is a graph illustrating an example OPR changed based on a transparency according to various embodiments.

The graph 1400 of FIG. 14 illustrates an example of representing a value for the OPR changed according to a transparency for an OPR of a visual object. A horizontal axis of the graph 1400 may represent an OPR (unit: %) before the change, and a vertical axis may represent an OPR (unit: %) after the change.

The graph 1400 illustrates a line 1410 representing an OPR that is changed based on a transparency after performing sampling (e.g., 75%) for the OPR of the visual object. For example, in case that the OPR of the visual object is 10%, the OPR may be changed to 7.5% according to sampling. For example, a reference line 1420 may represent a case in which an initially identified OPR for the visual object is 10%. Accordingly, a portion 1411 located on a left side of the line 1410 with respect to the reference line 1420 may represent a case in which an OPR identified for the visual object is less than or equal to 10%. A portion 1412 located on a right side of the line 1410 with respect to the reference line 1420 may represent a case in which the OPR identified for the visual object exceeds 10%.

Referring to the line 1410, the portion 1411 may represent a new OPR of the visual object identified based on changing a transparency of the visual object from a first value (e.g., 1.0) to a third value (e.g., 0.6). For example, in case that the initially identified OPR is 8%, the identified OPR may change to 6% depending on sampling. The new OPR identified based on the change of the transparency may be 3.6(6*0.6) %. In addition, referring to the line 1410, the portion 1412 may represent a new OPR of the visual object identified based on changing the transparency of the visual object from the first value (e.g., 1.0) to the second value (e.g., 0.45). For example, in case that the initially identified OPR is 16%, the identified OPR may be changed to 12% depending on sampling. The new OPR identified based on the change of the transparency may be 4.05(12*0.45) %. In addition, for example, in case that the initially identified OPR is 32%, the identified OPR may be changed to 24% depending on sampling. The new OPR identified based on the change of the transparency may be 10.80(24*0.45) %.

Referring to the above, the electronic device 101 may identify the OPR of the visual object and may identify a new OPR based on the transparency for the identified OPR. The graph 1400 illustrates an example of performing sampling by 75% for the OPR of the visual object and then identifying the new OPR based on the transparency, but the present disclosure is not limited thereto. For example, the new OPR may be identified based on an OPR for which sampling has not been performed. In addition, for example, the new OPR may be identified based on the OPR for which sampling has been performed at different rates.

Figure 15:
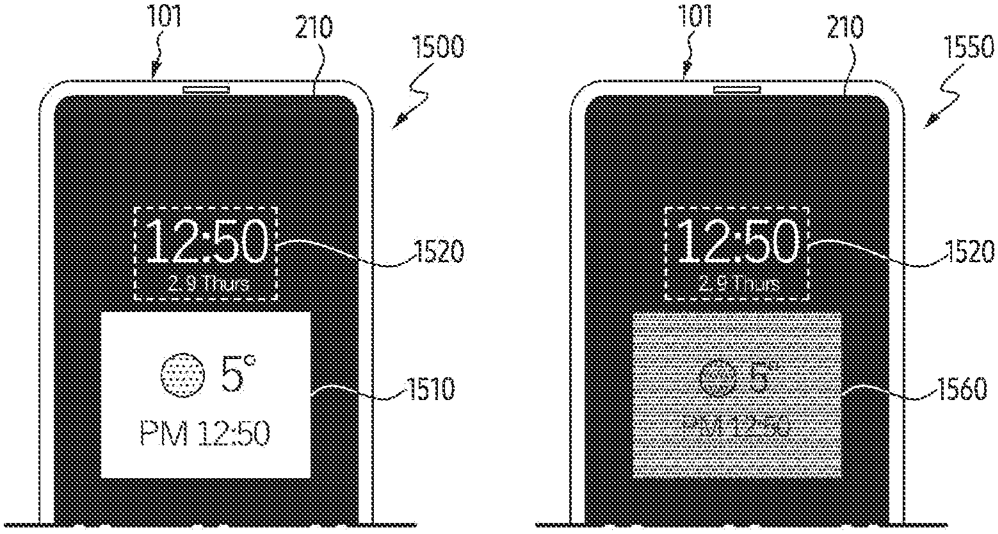
FIG. 15 is a diagram illustrating examples of displaying a screen including a visual object according to various embodiments.

FIG. 15 is a diagram illustrating examples of displaying a screen including a visual object according to various embodiments.

The screen may represent a screen for the low power state. For example, the screen may be referred to as an AOD screen.

FIG. 15 illustrates an example 1500 of an electronic device 101 displaying an AOD screen 210 including a visual object in which an OPR of the visual object obtained from a first software application is not adjusted. FIG. 15 illustrates an example 1550 of the electronic device 101 displaying the AOD screen 210 including the visual object having an OPR adjusted the OPR of the visual object using a second software application. For example, the first software application may include a software application that provides weather information. For example, the second software application may include a software application for setting the AOD screen 210 and a lock screen.

Referring to the example 1500, the electronic device 101 may display the AOD screen 210 including a visual object 1510 representing the weather information and a visual object 1520 representing time. For example, the visual object 1510 may be related to the first software application that provides the weather information. For example, in response to an event for displaying the visual object 1510, the electronic device 101 may display the AOD screen 210 based on an image representing the visual object 1510 obtained from the first software application. The visual object 1510 may represent a visual object that has not been processed by the second software application. For example, the visual object 1510 may represent a visual object having an OPR identified based on the image provided by the first software application.

Referring to the example 1550, the electronic device 101 may display the AOD screen 210 including a visual object 1560 representing the weather information and the visual object 1520 representing the time. For example, the visual object 1560 may be related to the first software application that provides the weather information. For example, the electronic device 101 may identify an image representing the visual object 1560 obtained from the first software application in response to an event for displaying the visual object 1560. For example, the electronic device 101 may adjust an OPR of the visual object 1560 using the second software application based on the image. For example, based on the image representing the visual object 1560 obtained from the first software application, the electronic device 101 may identify the OPR of the visual object 1560 using the second software application. The electronic device 101 may compare the identified OPR and a reference OPR using the second software application. In case that the identified OPR exceeds the reference OPR, the electronic device 101 may identify a new OPR by adjusting a transparency of the visual object 1560 using the second software application. Accordingly, the electronic device 101 may display the AOD screen 210 including the visual object 1560 having the new OPR.

Referring to the examples 1500 and 1550, the visual object 1510 may be brighter than visual object 1560. For example, a brightness level of the visual object 1510 may be higher than a brightness level of the visual object 1560. The brightness level may represent that the higher the level, the brighter it is.

Referring to the above, a brightness level of a visual object (e.g., a widget) displayed on the AOD screen 210 may be changed by adjusting a transparency using the second software application. Accordingly, the electronic device 101 may prevent and/or reduce burn-in and an afterimage and may reduce power consumption by dynamically adjusting the OPR in case of displaying the visual object (e.g., the widget) on the AOD screen 210.

FIGS. 16, 17, 18 and 19 are diagrams illustrating examples of displaying a screen including a visual object having an adjusted transparency in response to an event according to various embodiments.

For example, the screen may represent a screen for the low power state. For example, the screen may be referred to as an AOD screen. For example, the event may include at least one of a display (or addition) of the visual object, activation of an AOD function, a designated interval, a change (or update) of at least a portion of the visual object, or an event that changes a theme of the screen. The screen on which the theme is changed may include screens that the electronic device 101 may display.

Figure 16:
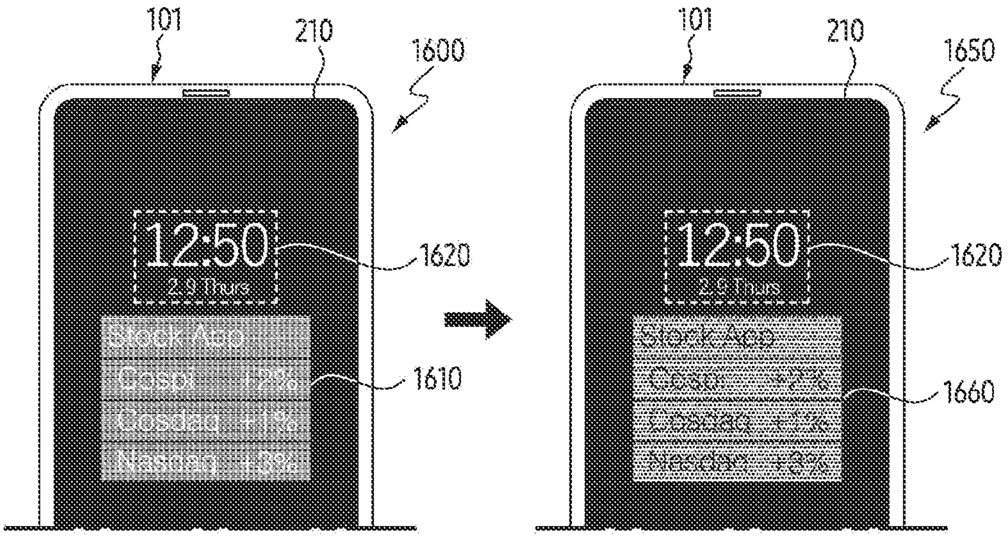
FIGS. 16, 17, 18 and 19 are diagrams illustrating examples of displaying a screen including a visual object having an adjusted transparency in response to an event according to various embodiments.

FIG. 16 illustrates an example of displaying an OPR having an adjusted transparency in response to the event that changes the theme. Example 1600 represents the electronic device 101 displaying an AOD screen 210 including a visual object 1610 having an OPR adjusted using a second software application in a dark theme. Example 1650 represents the electronic device 101 displaying the AOD screen 210 including a visual object 1660 having the OPR adjusted using the second software application, in response to an event in which the dark theme is released. For example, the visual object 1610 and the visual object 1660 may be visual objects representing stock information. The visual object 1610 and the visual object 1660 may be related to a first software application. For example, the first software application may include a software application that provides the stock information. For example, the second software application may include a software application for setting the AOD screen 210 and a lock screen.

Referring to the example 1600, the electronic device 101 may display the AOD screen 210 including the visual object 1610 representing the stock information and a visual object 1620 representing time. For example, the electronic device 101 may identify an image representing the visual object 1610 obtained from the first software application in response to an event for displaying the visual object 1610. For example, the electronic device 101 may adjust an OPR of the visual object 1610 using the second software application based on identifying that a theme of the electronic device 101 is the dark theme and the image. For example, based on the image representing the visual object 1610 obtained from the first software application, the electronic device 101 may identify the OPR of the visual object 1610 using the second software application. For example, the OPR of the visual object 1610 may be identified based on the visual object 1610 in a state in which black and white are inverted as the visual object to be displayed from the image applies the dark theme. For example, an OPR of an image to which the dark theme is applied may be lower than an OPR of an image to which the dark theme is not applied. The electronic device 101 may compare the identified OPR and a reference OPR using the second software application. In case that the identified OPR exceeds the reference OPR, the electronic device 101 may identify a new OPR by adjusting a transparency of the visual object 1610 using the second software application. Accordingly, the electronic device 101 may display the AOD screen 210 including the visual object 1610 having the new OPR.

Referring to the example 1650, the electronic device 101 may display the AOD screen 210 including the visual object 1660 representing the stock information and the visual object 1620 representing the time. For example, while displaying the visual object 1610, the electronic device 101 may identify an image representing the visual object 1660 obtained from the first software application in response to an event representing that the dark theme is released. For example, the electronic device 101 may adjust an OPR of the visual object 1660 using the second software application based on the image. For example, based on the image representing the visual object 1660 obtained from the first software application, the electronic device 101 may identify the OPR of the visual object 1660 using the second software application. For example, the OPR of the visual object 1660 may be identified based on the visual object 1660 to be displayed in case that the dark theme is released (or a state in which the dark theme is not applied). The electronic device 101 may compare the identified OPR and the reference OPR using the second software application. In case that the identified OPR exceeds the reference OPR, the electronic device 101 may identify a new OPR by adjusting a transparency of the visual object 1660 using the second software application. Accordingly, the electronic device 101 may display the AOD screen 210 including the visual object 1660 having the new OPR.

Referring to the examples 1600 and 1650, the visual object 1610 and the visual object 1660 may be displayed darker than a visual object (e.g., a visual object represented by the image) whose OPR is not adjusted based on deactivation of the second software application. For example, a brightness level of the visual object 1610 may be lower than a brightness level of the visual object whose OPR is not adjusted. For example, a brightness level of the visual object 1660 may be lower than the brightness level of the visual object whose OPR is not adjusted. The brightness level may represent that the higher the level, the brighter it is.

In FIG. 16, for convenience of explanation, as in the example 1600, in a state of displaying the visual object 1610 having the OPR adjusted using the second software application, an example of displaying the visual object 1660 in response to the event is illustrated. However, the present disclosure is not limited thereto. For example, in a state of displaying the screen 210 that does not include the visual object 1610, in response to an event (e.g., adding the visual object 1660), the AOD screen 210 including the visual object 1660 having the OPR adjusted using the second software application may be displayed.

Figure 17:
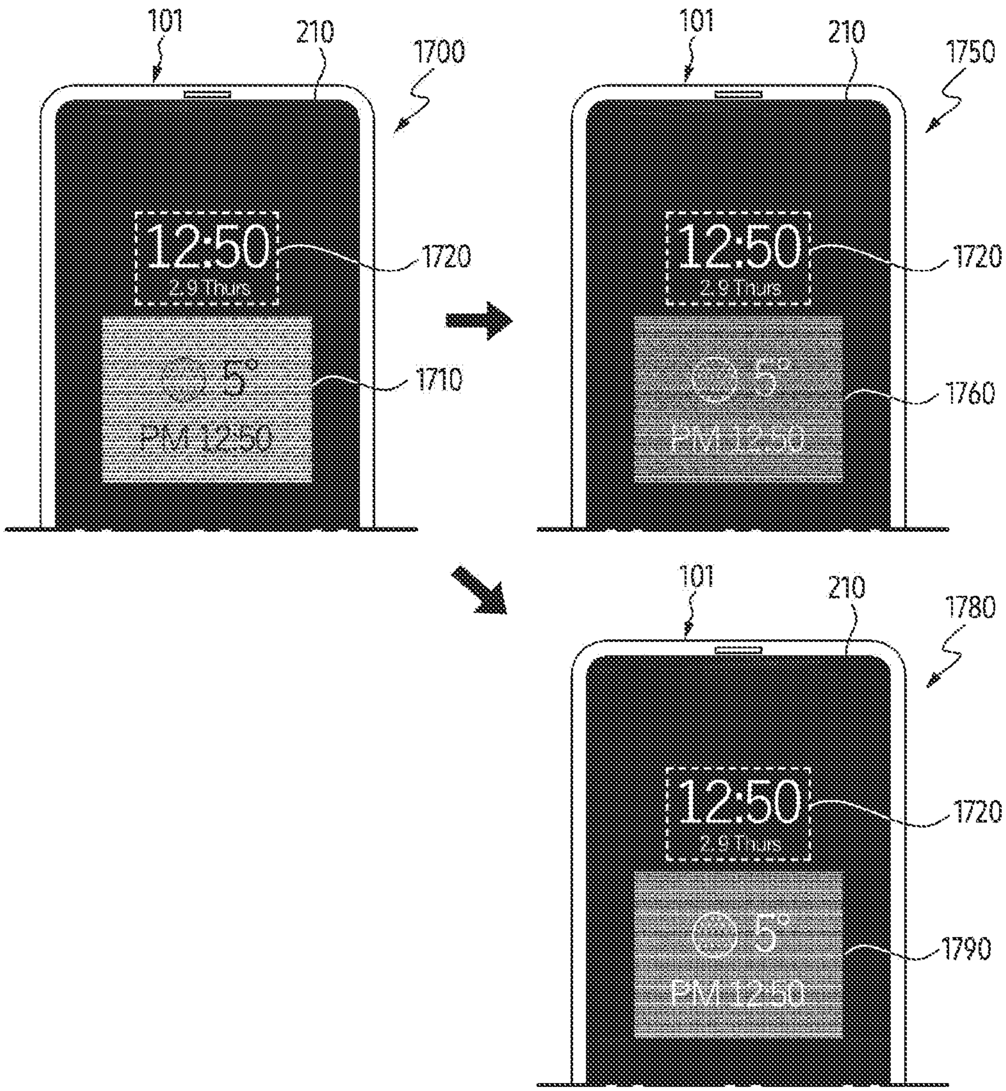

FIG. 17 is a diagram illustrating an example of displaying an OPR having an adjusted transparency in response to an event for changing a theme according to various embodiments. An example 1700 represents the electronic device 101 displaying the AOD screen 210 including a visual object 1710 having the OPR adjusted using a second software application. Example 1750 represents the electronic device 101 displaying the AOD screen 210 including a visual object 1760 having an OPR adjusted using the second software application in response to an event that is changed to the dark theme. Example 1780 represents the electronic device 101 displaying the AOD screen 210 including a visual object 1790 having an unadjusted OPR in response to the event that is changed to the dark theme. For example, the visual object 1710, the visual object 1760, and the visual object 1790 may be a visual object representing the weather information. The visual object 1710, the visual object 1760, and the visual object 1790 may be related to the first software application. For example, the first software application may include a software application that provides the weather information. For example, the second software application may include a software application for setting the AOD screen 210 and a lock screen.

Referring to the example 1700, the electronic device 101 may display the AOD screen 210 including the visual object 1710 representing the weather information and a visual object 1720 representing time. For example, the electronic device 101 may identify an image representing the visual object 1710 obtained from the first software application in response to an event for displaying the visual object 1710. For example, the electronic device 101 may adjust the OPR of the visual object 1710 using the second software application based on the image. For example, based on the image representing the visual object 1710 obtained from the first software application, the electronic device 101 may identify the OPR of the visual object 1710 using the second software application. The electronic device 101 may compare the identified OPR and a reference OPR using the second software application. In case that the identified OPR exceeds the reference OPR, the electronic device 101 may identify a new OPR by adjusting a transparency of the visual object 1710 using the second software application. Accordingly, the electronic device 101 may display the AOD screen 210 including the visual object 1710 having the new OPR.

Referring to the example 1750, the electronic device 101 may display the AOD screen 210 including the visual object 1760 representing the weather information and the visual object 1720 representing the time. For example, while displaying the visual object 1710, the electronic device 101 may identify an image representing the visual object 1760 obtained from the first software application in response to an event that changes to the dark theme. For example, the electronic device 101 may adjust an OPR of the visual object 1760 using the second software application based on identifying that a theme of the electronic device 101 is the dark theme and the image. For example, based on the image representing the visual object 1760 obtained from the first software application, the electronic device 101 may identify the OPR of the visual object 1760 using the second software application. For example, the OPR of the visual object 1760 may be identified based on the visual object 1760 in a state in which black and white are inverted as the visual object to be displayed from the image applies the dark theme. For example, an OPR of an image to which the dark theme is applied may be lower than an OPR of an image to which the dark theme is not applied. The electronic device 101 may compare the identified OPR and a reference OPR using the second software application. In case that the identified OPR exceeds the reference OPR, the electronic device 101 may identify a new OPR by adjusting a transparency of the visual object 1760 using the second software application. Accordingly, the electronic device 101 may display the AOD screen 210 including the visual object 1760 having the new OPR.

Referring to the example 1780, the electronic device 101 may display the AOD screen 210 including the visual object 1790 representing the weather information and the visual object 1720 representing the time. For example, while displaying the visual object 1710, the electronic device 101 may identify an image representing the visual object 1790 obtained from the first software application in response to the event that changes to the dark theme. For example, the electronic device 101 may display the visual object 1790 without additional OPR adjustment based on identifying that the theme of the electronic device 101 is the dark theme and the image. For example, the electronic device 101 may identify the OPR of the visual object 1790 based on the image and the dark theme. For example, the OPR of the visual object 1790 may be identified based on the visual object 1790 in the state in which black and white are inverted as the visual object to be displayed from the image applies the dark theme. As the dark theme is applied, in case that the OPR is less than or equal to the reference OPR, the electronic device 101 may display the AOD screen 210 including the visual object 1790 corresponding to the OPR without adjusting a transparency. As the dark theme is applied, in case that the OPR is less than or equal to the reference OPR, the electronic device 101 may identify a new OPR by slightly adjusting (e.g., in case of changing from the first value to the third value of FIG. 13) the transparency of the visual object 1790 using the second software application. Accordingly, the electronic device 101 may display the AOD screen 210 including the visual object 1790 having the new OPR.

Referring to the examples 1700 and 1750, the visual object 1710 and the visual object 1760 may be displayed darker than the visual object (e.g., a visual object represented by the image) whose OPR is not adjusted based on the deactivation of the second software application. For example, a brightness level of the visual object 1710 may be lower than a brightness level of the visual object whose OPR is not adjusted. For example, a brightness level of the visual object 1760 may be lower than the brightness level of the visual object whose OPR is not adjusted. The brightness level may represent that the higher the level, the brighter it is.

Referring to examples 1750 and 1780, the visual object 1760 may be displayed darker than the visual object 1790. For example, even if the electronic device 101 is in a state in which the same dark theme is applied, a brightness level of the visual object 1760 may be lower than a brightness level of the visual object 1790 whose OPR is not adjusted (or slightly adjusted). For example, a brightness level of the visual object 1760 may be lower than the brightness level of the visual object 1790 whose OPR is not adjusted.

In FIG. 17, for convenience of explanation, as in the example 1700, in a state of displaying the visual object 1710 having the OPR adjusted using the second software application, an example of displaying the visual object 1760 or the visual object 1790 in response to the event is illustrated. However, the present disclosure is not limited thereto. For example, in a state of displaying the screen 210 that does not include the visual object 1710, the AOD screen 210 including the visual object 1760 may be displayed in response to the event (e.g., a change of the theme). In a state of displaying the AOD screen 210 that does not include the visual object 1710, the AOD screen 210 including the visual object 1760 may be displayed in response to the event (e.g., the change of the theme).

Figure 18:
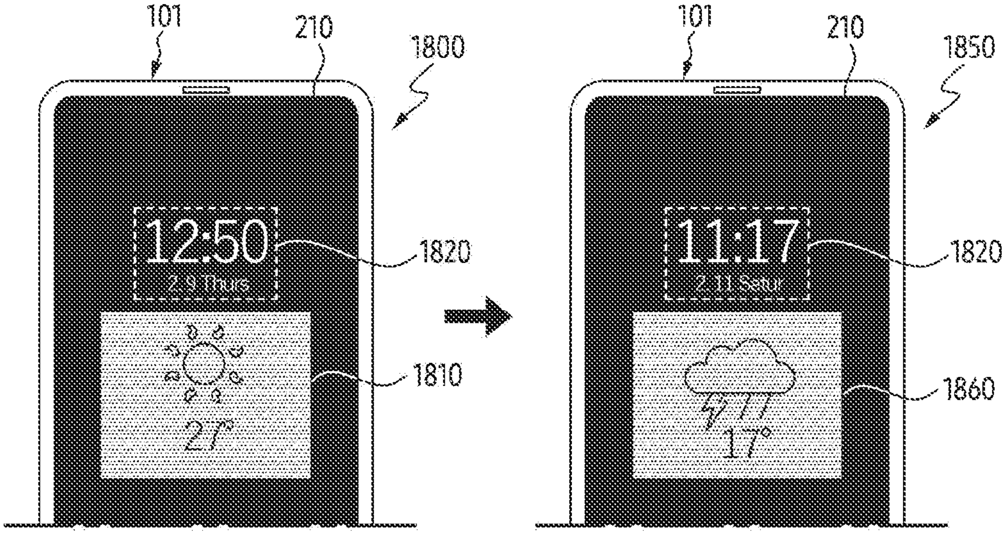

FIG. 18 is a diagram illustrating an example of displaying an OPR having adjusted transparency in response to an event in which at least a portion of a visual object is changed according to various embodiments. Example 1800 represents an electronic device 101 displaying an AOD screen 210 including a visual object 1810 having an OPR adjusted using a second software application. Example 1850 represents the electronic device 101 displaying the AOD screen 210 including a visual object 1860 having the OPR adjusted using the second software application in response to an event displaying the visual object 1860 that has changed from the visual object 1810. For example, the visual object 1810 and the visual object 1860 may be visual objects representing weather information. The visual object 1810 and the visual object 1860 may be related to a first software application. For example, the first software application may include a software application that provides the weather information. For example, the second software application may include a software application for setting the AOD screen 210 and a lock screen.

Referring to the example 1800, the electronic device 101 may display the AOD screen 210 including the visual object 1810 representing the weather information and a visual object 1820 representing time. For example, the electronic device 101 may identify an image representing the visual object 1810 obtained from the first software application in response to an event for displaying the visual object 1810. For example, the electronic device 101 may adjust the OPR of the visual object 1810 using the second software application based on the image. For example, based on the image representing the visual object 1810 obtained from the first software application, the electronic device 101 may identify the OPR of the visual object 1810 using the second software application. The electronic device 101 may compare the identified OPR and a reference OPR using the second software application. In case that the identified OPR exceeds the reference OPR, the electronic device 101 may identify a new OPR by adjusting a transparency of the visual object 1810 using the second software application. Accordingly, the electronic device 101 may display the AOD screen 210 including the visual object 1810 having the new OPR.

Referring to the example 1850, the electronic device 101 may display the AOD screen 210 including the visual object 1860 representing the weather information and the visual object 1820 representing the time. For example, while displaying the visual object 1810, the electronic device 101 may identify an image representing the visual object 1860 obtained from the first software application in response to an event displaying the visual object 1860 changed from the visual object 1810. For example, based on the image representing the visual object 1860 obtained from the first software application, the electronic device 101 may identify the OPR of the visual object 1860 using the second software application. The electronic device 101 may compare the identified OPR and the reference OPR using the second software application. In case that the identified OPR exceeds the reference OPR, the electronic device 101 may identify a new OPR by adjusting a transparency of the visual object 1860 using the second software application. Accordingly, the electronic device 101 may display the AOD screen 210 including the visual object 1860 having the new OPR.

Referring to the examples 1800 and 1850, the visual object 1810 and the visual object 1860 may be displayed darker than a visual object (e.g., a visual object represented by the image) whose OPR is not adjusted based on deactivation of the second software application. For example, a brightness level of the visual object 1810 may be lower than a brightness level of the visual object whose OPR is not adjusted. For example, a brightness level of the visual object 1860 may be lower than the brightness level of the visual object whose OPR is not adjusted. The brightness level may represent that the higher the level, the brighter it is.

In FIG. 18, for convenience of explanation, as in the example 1800, in a state of displaying the visual object 1810 having the OPR adjusted using the second software application, an example of displaying the visual object 1860 in response to the event is illustrated. However, the present disclosure is not limited thereto. For example, in a state of displaying the screen 210 that does not include the visual object 1810, the AOD screen 210 including the visual object 1860 may be displayed in response to an event (e.g., a change of a theme).

Figure 19:
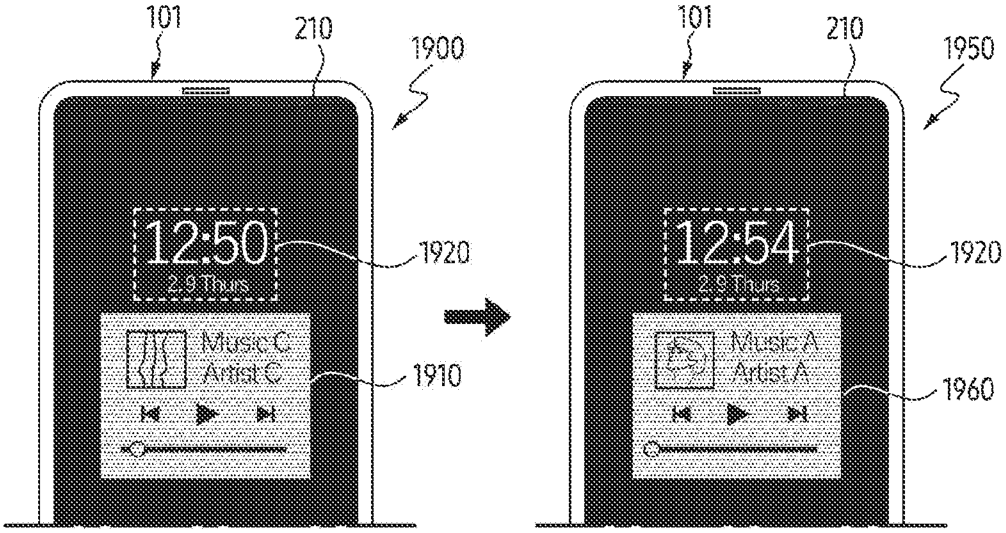

FIG. 19 is a diagram illustrating an example of displaying an OPR having adjusted transparency in response to an event in which at least a portion of a visual object is changed according to various embodiments. Example 1900 represents an electronic device 101 displaying an AOD screen 210 including a visual object 1910 having an OPR adjusted using a second software application. Example 1950 represents the electronic device 101 displaying the AOD screen 210 including a visual object 1960 having the OPR adjusted using the second software application in response to an event displaying the visual object 1960 that has changed from the visual object 1910. For example, the visual object 1910 and the visual object 1960 may be visual objects representing music information. The visual object 1910 and the visual object 1960 may be related to a first software application. For example, the first software application may include a software application that provides the music information. For example, the second software application may include a software application for setting the AOD screen 210 and a lock screen.

Referring to the example 1900, the electronic device 101 may display the AOD screen 210 including the visual object 1910 representing the music information and a visual object 1920 representing time. For example, the electronic device 101 may identify an image representing the visual object 1910 obtained from the first software application in response to an event for displaying the visual object 1910. For example, the electronic device 101 may adjust the OPR of the visual object 1910 using the second software application based on the image. For example, based on the image representing the visual object 1910 obtained from the first software application, the electronic device 101 may identify the OPR of the visual object 1910 using the second software application. The electronic device 101 may compare the identified OPR and a reference OPR using the second software application. In case that the identified OPR exceeds the reference OPR, the electronic device 101 may identify a new OPR by adjusting a transparency of the visual object 1910 using the second software application. Accordingly, the electronic device 101 may display the AOD screen 210 including the visual object 1710 having the new OPR.

Referring to the example 1950, the electronic device 101 may display the AOD screen 210 including the visual object 1960 representing the music information and the visual object 1920 representing the time. For example, while displaying the visual object 1910, the electronic device 101 may identify an image representing the visual object 1960 obtained from the first software application in response to an event displaying the visual object 1960 changed from the visual object 1910. For example, based on the image representing the visual object 1960 obtained from the first software application, the electronic device 101 may identify the OPR of the visual object 1960 using the second software application. The electronic device 101 may compare the identified OPR and the reference OPR using the second software application. In case that the identified OPR exceeds the reference OPR, the electronic device 101 may identify a new OPR by adjusting a transparency of the visual object 1960 using the second software application. Accordingly, the electronic device 101 may display the AOD screen 210 including the visual object 1960 having the new OPR.

Referring to the examples 1900 and 1950, the visual object 1910 and the visual object 1960 may be displayed darker than a visual object (e.g., a visual object represented by the image) whose OPR is not adjusted based on deactivation of the second software application. For example, a brightness level of the visual object 1910 may be lower than a brightness level of the visual object whose OPR is not adjusted. For example, a brightness level of the visual object 1960 may be lower than the brightness level of the visual object whose OPR is not adjusted. The brightness level may represent that the higher the level, the brighter it is.

In FIG. 19, for convenience of explanation, as in the example 1900, in a state of displaying the visual object 1910 having the OPR adjusted using the second software application, an example of displaying the visual object 1960 in response to the event is illustrated. However, the present disclosure is not limited thereto. For example, in a state of displaying the screen 210 that does not include the visual object 1910, the AOD screen 210 including the visual object 1960 may be displayed in response to an event (e.g., a change of a theme).

Figure 20A:
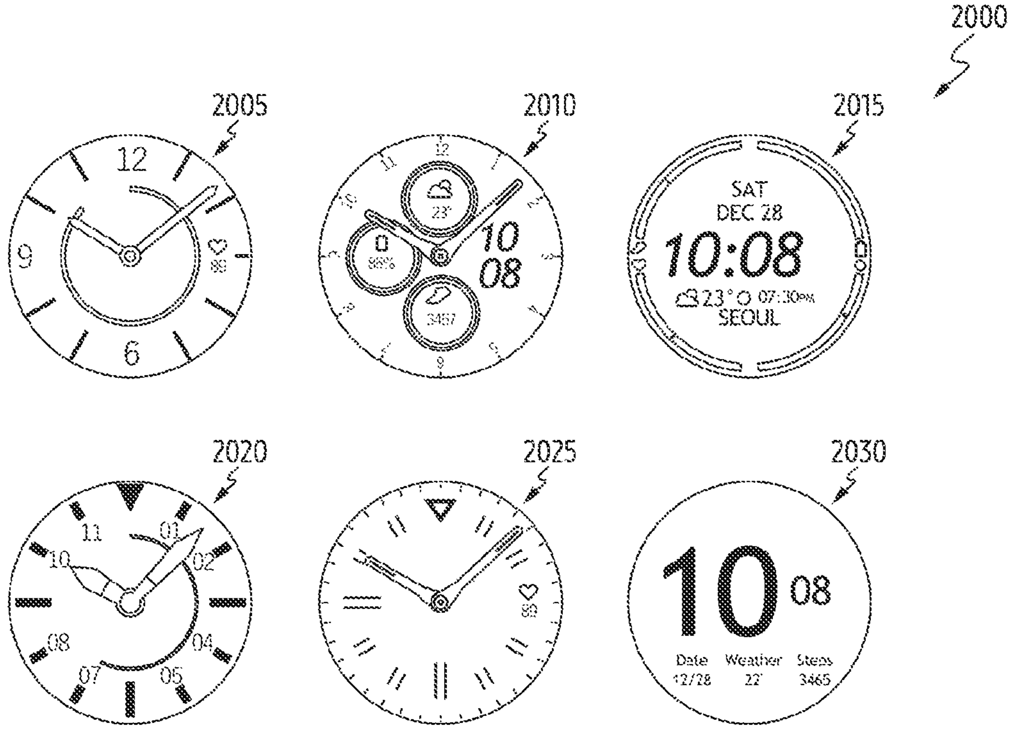
FIGS. 20A and 20B are diagrams illustrating examples of a wearable device displaying a screen including a visual object having an adjusted transparency according to various embodiments.
Figure 20B:
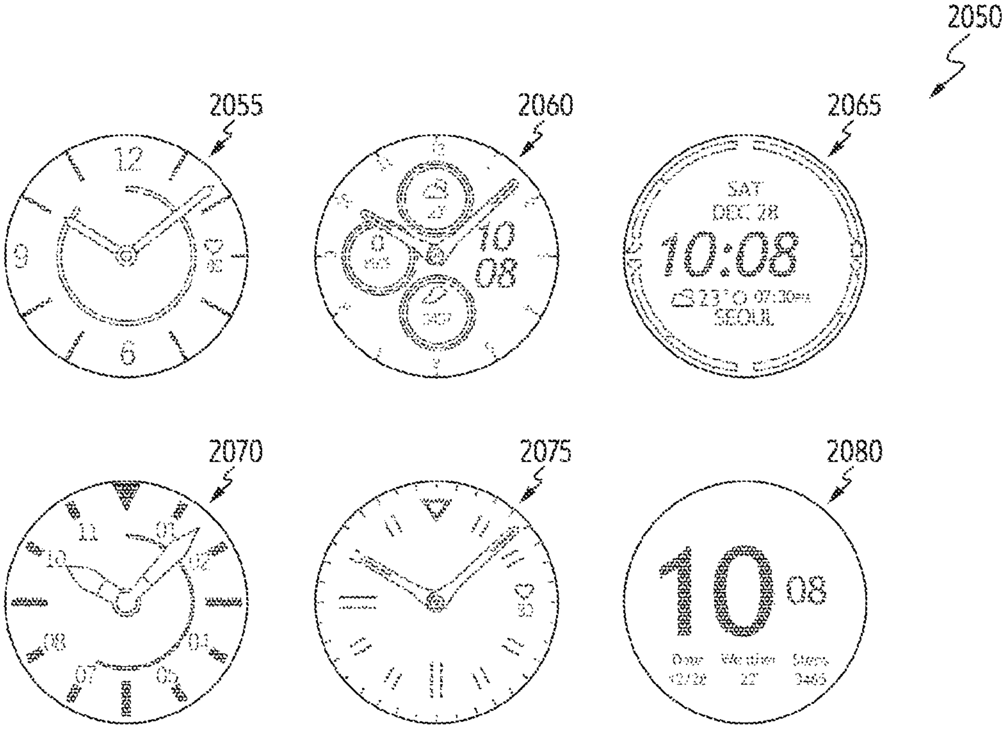

FIGS. 20A and 20B are diagrams illustrating examples of a wearable device displaying a screen including a visual object having an adjusted transparency according to various embodiments.

The wearable device of FIGS. 20A and 20B may represent an example of an electronic device 101 of FIG. 3. For example, the wearable device may refer to an electronic device worn on a portion of a user's body. For example, the wearable device may include an electronic device in a form of a watch. However, the present disclosure is not limited thereto.

For example, the wearable device may display a screen through a display (e.g., a display panel 340 of FIG. 3). The wearable device may display a screen for a low power state through the display while the wearable device operates in the low power state. The screen for the low power state may be referred to as an AOD screen.

For example, the wearable device may display the AOD screen including a visual object. The visual object may include a widget included in the AOD screen.

Example 2000 illustrates the AOD screens 2005, 2010, 2015, 2020, 2025, and 2030 displayed while the wearable device is in the low power state. Example 2000 may represent a state in which an OPR of a visual object included in the AOD screens 2005, 2010, 2015, 2020, 2025, and 2030 has not been adjusted. If in case that the OPR of the visual object of each of the AOD screens 2005, 2010, 2015, 2020, 2025, and 2030 exceeds a reference OPR, burn-in/afterimage may occur and power consumption may increase.

Example 2050 illustrates the AOD screens 2055, 2060, 2065, 2070, 2075, and 2080 displayed while the wearable device is in the low power state. The example 2050 may represent the AOD screens 2055, 2060, 2065, 2070, 2075, and 2080 including a visual object having an adjusted OPR using the second software application. For example, the wearable device may identify the OPR of the visual object using the second software application, based on an image obtained from a software application (e.g., a first software application) that provides the visual object. For example, the wearable device may adjust a value representing a transparency of the visual object using the second software application in response to the identified OPR greater than the reference OPR. For example, the wearable device may identify a new OPR of the visual object based on the identified OPR and a value representing the adjusted transparency. For example, the wearable device may display the AOD screen including a visual object having the new OPR.

Referring to the examples 2000 and 2050, the AOD screens of the example 2050 may be displayed darker than the AOD screens of the example 2000. For example, at least one visual object in the AOD screen 2055 may be displayed darker than at least one visual object in the AOD screen 2005. For example, at least one visual object in the AOD screen 2060 may be displayed darker than at least one visual object in the AOD screen 2010. For example, at least one visual object in the AOD screen 2065 may be displayed darker than at least one visual object in the AOD screen 2015. For example, at least one visual object in the AOD screen 2070 may be displayed darker than at least one visual object in the AOD screen 2020. For example, at least one visual object in the AOD screen 2075 may be displayed darker than at least one visual object in the AOD screen 2025. As described above, the wearable device may reduce a frequency of occurrence of the burn-in and the afterimage and may reduce the power consumption by dynamically adjusting the OPR of the at least one visual object.

As described above, an electronic device according to an example embodiment may comprise memory storing instructions. The electronic device may comprise at least one processor, comprising processing circuitry. The electronic device may comprise a display panel including a plurality of pixels. The instructions, when executed by at least one processor individually and/or collectively, may cause the electronic device to display, through the display panel, a screen for a low-power state including at least one visual object. The instructions, when executed by at least one processor individually and/or collectively, may cause the electronic device to identify an event for displaying a visual object in the screen while displaying the screen. The instructions, when executed by at least one processor individually and/or collectively, may cause the electronic device to identify an on-pixel ratio (OPR) of the visual object in response to the event. The instructions, when executed by at least one processor individually and/or collectively, may cause the electronic device to based on changing a first value representing an attribute of the visual object to a second value lower than the first value in response to the OPR being higher than a reference OPR, display, through the display panel, the screen including the visual object.

As described above, an electronic device according to an example embodiment may comprise memory storing instructions. The electronic device may comprise at least one processor, comprising processing circuitry. The electronic device may comprise a display panel including a plurality of pixels. The instructions, when executed by at least one processor individually and/or collectively, may cause the electronic device to display, through the display panel, a screen for a low-power state including at least one visual object. The instructions, when executed by at least one processor individually and/or collectively, may cause the electronic device to identify an event for displaying a visual object in the screen while displaying the screen. The instructions, when executed by at least one processor individually and/or collectively, may cause the electronic device to identify an on-pixel ratio (OPR) of the visual object obtained from a first software application using a second software application in response to the event. The instructions, when executed by at least one processor individually and/or collectively, may cause the electronic device to, based on changing a first value representing an attribute of the visual object to a second value lower than the first value in response to the OPR being higher than a reference OPR, using the second software application, display, through the display panel, the screen including the visual object. The instructions, when executed by at least one processor individually and/or collectively, may cause the electronic device to, based on changing the first value of the visual object to a third value lower than the first value and higher than the second value in response to the OPR being lower than or equal to the reference OPR, using the second software application, display, through the display panel, the screen including the visual object.

According to an example embodiment, the instructions, when executed by at least one processor individually and/or collectively, may cause the electronic device to, based on an image representing the visual object obtained from a first software application for the visual object, change the first value to the second value using a second software application. The attribute may include a transparency of the visual object included in the screen.

According to an example embodiment, the instructions, when executed by at least one processor individually and/or collectively, may cause the electronic device to identify the OPR based on at least part of the plurality of pixels to be used to display the image. The instructions, when executed by at least one processor individually and/or collectively, may cause the electronic device to identify the first value based on the image.

According to an example embodiment, the instructions, when executed by at least one processor individually and/or collectively, may cause the electronic device to, based on changing the first value of the visual object to a third value using the second software application in response to the OPR being lower than or equal to the reference OPR, display, through the display panel, the screen including the visual object. The third value may be lower than the first value and may be higher than the second value.

According to an example embodiment, the instructions, when executed by at least one processor individually and/or collectively, may cause the electronic device to identify whether the image is displayed in the screen for the low power state. According to an example embodiment, The instructions, when executed by at least one processor individually and/or collectively, may cause the electronic device to identify the OPR using the second software application in response to identifying that the image is displayed in the screen. According to an embodiment, The instructions, when executed by at least one processor individually and/or collectively, may cause the electronic device to display, through the display panel, another screen including the visual object in response to identifying that the image is displayed in the other screen for a state different from the low-power state.

According to an example embodiment, the other screen may include a screen for displaying lock state of the electronic device.

According to an example embodiment, the second software application may include a software application for setting with respect to the screen. The setting with respect to the screen may include a function editing the visual object displayed through the screen.

According to an example embodiment, the instructions, when executed by at least one processor individually and/or collectively, may cause the electronic device to display, through the display panel, a user interface of the second software application including a preview for the screen based on executing of the second software application. The instructions, when executed by at least one processor individually and/or collectively, may cause the electronic device to set the visual object to be displayed in the screen based on at least one input with respect to an icon included in the user interface. The instructions, when executed by at least one processor individually and/or collectively, may cause the electronic device to display, through the display panel, the user interface including an item corresponding to the visual object in response to the setting.

According to an example embodiment, the instructions, when executed by at least one processor individually and/or collectively, may cause the electronic device to adjust a size of the item based on at least one input with respect to the item. The screen may include the visual object having the adjusted size.

According to an example embodiment, the instructions, when executed by at least one processor individually and/or collectively, may cause the electronic device to display another user interface for adjusting the attribute of the visual object based on at least one input with respect to the item. The instructions, when executed by at least one processor individually and/or collectively, may cause the electronic device to adjust the attribute based on at least one input with respect to the user interface.

According to an example embodiment, the instructions, when executed by at least one processor individually and/or collectively, may cause the electronic device to display the screen including another visual object associated with a first software application for the visual object. The instructions, when executed by at least one processor individually and/or collectively, may cause the electronic device to identify the event while the screen including the other visual object is displaying.

According to an example embodiment, the event may include at least one of updating from the other visual object to the visual object, a designated interval, or changing a theme of the screen.

According to an example embodiment, the instructions, when executed by at least one processor individually and/or collectively, may cause the electronic device to identify another event for displaying another visual object in the screen using a third software application while the screen is displaying. The instructions, when executed by at least one processor individually and/or collectively, may cause the electronic device to identify another OPR of the other visual object based on the second software application in response to the other event. The instructions, when executed by at least one processor individually and/or collectively, may cause the electronic device to display, through the display panel, the screen including the other visual object based on changing a fourth value representing a transparency of the other visual object to a fifth value lower than the fourth value using the second software application in response to the other OPR higher than the reference OPR. The fifth value may differ from the second value.

According to an example embodiment, the low-power state may include a state displaying an always on display (AOD).

As described above, a method performed by an electronic device according to an example embodiment may comprise displaying, through a display panel of the electronic device, a screen for a low-power state including at least one visual object. The method may comprise identifying an event for displaying a visual object in the screen while displaying the screen. The method may comprise identifying an on-pixel ratio (OPR) of the visual object in response to the event. The method may comprise, based on changing a first value representing an attribute of the visual object to a second value lower than the first value in response to the OPR being higher than a reference OPR, displaying, through the display panel, the screen including the visual object.

As described above, a method performed by an electronic device according to an example embodiment may comprise displaying, through a display panel of the electronic device, a screen for a low-power state including at least one visual object. The method may comprise identifying an event for displaying a visual object in the screen while displaying the screen. The method may comprise identifying an on-pixel ratio (OPR) of the visual object obtained from a first software application using the second software application in response to the event. The method may comprise, based on changing a first value representing a transparency of the visual object to a second value lower than the first value using the second software application in response to the OPR being higher than a reference OPR, displaying, through the display panel, the screen including the visual object. The method may comprise, based on changing a first value of the visual object to a third value lower than the first value and higher than the second value using the second software application in response to the OPR being lower than or equal to a reference OPR, displaying, through the display panel, the screen including the visual object.

According to an example embodiment, the method may comprise based on an image representing the visual object obtained from a first software application for the visual object, changing the first value to the second value using a second software application. The attribute may include a transparency of the visual object included in the screen.

According to an example embodiment, the method may comprise identifying the OPR based on at least part of the plurality of pixels to be used to display the image. The method may comprise identifying the first value based on the image.

According to an example embodiment, the method may comprise, based on changing the first value of the visual object to a third value using the second software application in response to the OPR being lower than or equal to the reference OPR, displaying, through the display panel, the screen including the visual object. The third value may be lower than the first value and may be higher than the second value.

According to an example embodiment, the method may comprise identifying whether the image is displayed in the screen for the low power state. The method may comprise identifying the OPR using the second software application in response to identifying that the image is displayed in the screen. The method may comprise displaying, through the display panel, another screen including the visual object in response to identifying that the image is displayed in the other screen for a state different from the low-power state. The other screen may include a screen for displaying lock state of the electronic device.

According to an example embodiment, the low-power state may include a state displaying an always on display (AOD).

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising, memory including one or more storage media storing instructions;

at least one processor including processing circuitry; and a display including organic light emitting diodes (OLEDs), wherein the instructions, when executed by the at least one processor individually and/or collectively, cause the electronic device to:

display, through the display, a screen including a first visual object in a state of the display for a lower power consumption; and while displaying the screen including the first visual object in the state of the display:

identify an event for additionally displaying a second visual object in the screen that includes the first visual object, in response to the event, identify an on-pixel ratio (OPR) of the second visual object to be additionally displayed in the screen that includes the first visual object, based on the OPR of the second visual object being identified as lower than a reference OPR, display the screen including the first visual object having a first transparency and the second visual object having a second transparency, and based on the OPR of the second visual object being identified as higher than the reference OPR:

maintain a transparency of the first visual object as the first transparency;

adjust a transparency of the second visual object to a third transparency lower than the second transparency; and display the screen including the first visual object having the first transparency and the second visual object having the third transparency.

2. The electronic device of claim 1, wherein the instructions, when executed by the at least one processor individually and/or collectively, cause the electronic device to:

based on image data representing the second visual object obtained from a first software application for displaying a widget, adjust the transparency of the second visual object to the third transparency using a second software application setting a screen in the state of the display for the lower-power consumption.

3. The electronic device of claim 2, wherein the instructions, when executed by the at least one processor individually and/or collectively, cause the electronic device to:

identify the OPR based on at least a portion of the OLEDs to be used to display the second visual object.

4. The electronic device of claim 2, wherein the first visual object is obtained from a third software application related to a first party, wherein the second visual object is obtained from the first software application related a third party, and wherein each the first visual object and the second visual object is defined as a widget in the screen.

5. The electronic device of claim 2, wherein the second software application is a software application for changing a setting of a user interface including a setting of the screen.

6. The electronic device of claim 2, wherein the instructions, when executed by the at least one processor individually and/or collectively, cause the electronic device to:

display, through the display, a user interface of the second software application including a preview for the screen based on executing of the second software application, set the second visual object to be displayed in the screen based on at least one input with respect to an icon included in the user interface, and display, through the display, the user interface including an item corresponding to the second visual object in response to the setting.

7. The electronic device of claim 6, wherein the instructions, when executed by the at least one processor individually and/or collectively, cause the electronic device to:

adjust a size of the item based on at least one input with respect to the item, wherein the screen includes the second visual object having the adjusted size.

8. The electronic device of claim 6, wherein the instructions, when executed by the at least one processor individually and/or collectively, cause the electronic device to:

display another user interface for adjusting an attribute of the second visual object based on at least one input with respect to the item, and adjust the attribute of the second visual object based on at least one input with respect to the another user interface, wherein the attribute of the second visual object includes transparency of the second visual object.

9. The electronic device of claim 1, wherein the instructions, when executed by the at least one processor individually and/or collectively, cause the electronic device to:

identify another event for displaying a third visual object in the screen while the screen including the first visual object having the first transparency and the second visual object having the third transparency is displayed, in response to the another event, identify another OPR of the third visual object, and based on the another OPR of the third visual object being identified as lower than the reference OPR, display the screen including the first visual object having the first transparency, the second visual object having the third transparency, and the third visual object having a fourth transparency, and based on the another OPR of the third visual object being identified as higher than the reference OPR:

maintain the transparency of the first visual object as the first transparency;

maintain the transparency of the second visual object as the third transparency;

adjust a transparency of the third visual object to a fifth transparency lower than the fourth transparency; and display the screen including the first visual object having the first transparency, the second visual object having the third transparency, and the third visual object having the fifth transparency, wherein the fourth transparency is different from the third transparency.

10. The electronic device of claim 1, wherein the state of the display for the lower-power consumption is a state in which at least portion of the at least one processor is in a sleep state in at least portion of while displaying the screen.

11. A method performed by an electronic device with a display including organic light emitting diodes (OLEDs), the method comprising:

displaying, through the display, a screen including a first visual object in a state of the display for a lower power consumption; and while displaying the screen including the first visual object in the state of the display:

identifying an event for additionally displaying a second visual object in the screen that includes the first visual object, in response to the event, identifying an on-pixel ratio (OPR) of the second visual object to be additionally displayed in the screen that includes the first visual object, based on the OPR of the second visual object being identified as lower than a reference OPR, displaying the screen including the first visual object having a first transparency and the second visual object having a second transparency, and based on the OPR of the second visual object being identified as higher than the reference OPR:

maintaining a transparency of the first visual object as the first transparency;

adjusting a transparency of the second visual object to a third transparency lower than the second transparency; and displaying the screen including the first visual object having the first transparency and the second visual object having the third transparency.

12. The method of claim 11, the method comprising:

based on image data representing the second visual object obtained from a first software application for displaying a widget, adjusting the transparency of the second visual object to the third transparency using a second software application setting a screen in the state of the display for the lower power consumption.

13. The method of claim 12, the method comprising:

identifying the OPR based on at least a portion of the OLEDs to be used to display the second visual object.

14. The method of claim 12, wherein the first visual object is obtained from a third software application related to a first party, wherein the second visual object is obtained from the first software application related a third party, and wherein each the first visual object and the second visual object is defined as a widget in the screen.

15. The method of claim 12, wherein the second software application is a software application for changing a setting of a user interface including a setting of the screen.

16. The method of claim 12, the method comprising:

displaying, through the display, a user interface of the second software application including a preview for the screen based on executing of the second software application, setting the second visual object to be displayed in the screen based on at least one input with respect to an icon included in the user interface, and displaying, through the display, the user interface including an item corresponding to the second visual object in response to the setting.

17. The method of claim 16, the method comprising:

adjusting a size of the item based on at least one input with respect to the item, wherein the screen includes the second visual object having the adjusted size.

18. The method of claim 16, the method comprising:

displaying another user interface for adjusting an attribute of the second visual object based on at least one input with respect to the item, and adjusting the attribute of the second visual object based on at least one input with respect to the another user interface, wherein the attribute of the second visual object includes transparency of the second visual object.

19. The method of claim 11, the method comprising:

identifying another event for displaying a third visual object in the screen while the screen including the first visual object and the second visual object is displayed, in response to the another event, identifying another OPR of the third visual object, and based on the another OPR of the third visual object being identified as lower than the reference OPR, displaying the screen including the first visual object having the first transparency, the second visual object having the third transparency, and the third visual object having a fourth transparency, and based on the another OPR of the third visual object being identified as higher than the reference OPR:

maintaining the transparency of the first visual object as the first transparency;

maintaining the transparency of the second visual object as the third transparency;

adjusting a transparency of the third visual object to a fifth transparency lower than the fourth transparency; and displaying the screen including the first visual object having the first transparency, the second visual object having the third transparency, and the third visual object having the fifth transparency.

20. The method of claim 11, wherein the state of the display for the lower power consumption is a state in which at least portion of the at least one processor is in a sleep state in at least portion of while displaying the screen.

* * * * *